(12) United States Patent
Jung et al.

(10) Patent No.: US 7,385,598 B2
(45) Date of Patent: Jun. 10, 2008

(54) DRIVER FOR OPERATING MULTIPLE DISPLAY DEVICES

(75) Inventors: Young-Bae Jung, Gyeonggi-do (KR); Won-Kyu Lee, Gyeonggi-do (KR); Jin Jeon, Gyeonggi-do (KR); Ji-Suk Lim, Daejeon-Si (KR); Min-Kyung Jung, Busan-Si (KR); Eung-Sang Lee, Seoul (KR); Won-Seok Ma, Gyeonggi-do (KR)

(73) Assignee: Samsung Electronics, Co., Ltd., Kyungki-do (KR)

( * ) Notice: Subject to any disclaimer, the term of this patent is extended or adjusted under 35 U.S.C. 154(b) by 599 days.

(21) Appl. No.: 10/873,607

(22) Filed: Jun. 21, 2004

(65) Prior Publication Data

US 2005/0030254 A1    Feb. 10, 2005

(30) Foreign Application Priority Data

Jun. 27, 2003  (KR) ..................... 10-2003-0042356
Oct. 9, 2003   (KR) ..................... 10-2003-0070190

(51) Int. Cl.
*G09G 5/00* (2006.01)
(52) U.S. Cl. .................... 345/204; 345/1.1; 345/1.3; 345/87
(58) Field of Classification Search ............. 345/1.1, 345/1.3, 87, 204
See application file for complete search history.

(56) References Cited

U.S. PATENT DOCUMENTS

| 6,954,184 | B2 * | 10/2005 | Kurashima et al. | .......... 345/1.3 |
| 7,167,141 | B2 * | 1/2007 | Goto et al. | ................... 345/1.1 |
| 2003/0210215 | A1 * | 11/2003 | Takahashi | .................... 345/87 |

* cited by examiner

*Primary Examiner*—Richard Hjerpe
*Assistant Examiner*—Leonid Shapiro
(74) *Attorney, Agent, or Firm*—MacPherson Kwok Chen & Heid LLP; Mark A. Pellegrini

(57) ABSTRACT

A driver chip for controlling a high-resolution display panel is presented. The driver chip is not much larger than a conventional driver chip that is currently used for lower resolution display panels. The driver chip applies data signals to the data lines of the display panel and gate control signals to a gate driver that is formed in the peripheral region of the display panel. The gate driver, which may be made of amorphous silicon TFTs, generates gate signals in response to the gate control signals from the driver chip and applies the gate signals to gate lines. Since the driver chip of the invention controls more gate lines and data lines than a conventional chip of about the same size, the driver chip may be easily adapted for display devices having multiple panels. Where multiple panels are used, the panels may be scanned simultaneously or sequentially.

27 Claims, 17 Drawing Sheets

DRIVER FOR OPERATING MULTIPLE DISPLAY DEVICES

CROSS-REFERENCE TO RELATED APPLICATIONS

This application claims priority, under 35 USC § 119, from Korean Patent Application No. 2003-42356 filed on Jun. 27, 2003 and Korean Patent Application No. 2003-70190 filed on Oct. 9, 2003, the contents of which are incorporated herein by reference in their entirety.

BACKGROUND OF THE INVENTION

1. Field of the Invention

The present invention relates to a flat panel display device, and more particularly to a flat panel display device with high resolution.

2. Description of the Related Art

As wireless phones gained popularity over the past several years, many different models of wireless phones have come into existence. One of the popular models is a folding phone, commonly referred to as a "flip phone." A typical flip phone is made of a display module, a control module, and a hinge mechanism for connecting the two modules such that they can be folded into a compact form when the phone is not in use. The display module is used primarily for conveying information to users, and the control panel is used for receiving user input.

Flip phones often come in a dual-panel configuration, whereby the display module includes multiple liquid crystal display (LCD) panels. Sometimes, the display module is made with two LCD panels: a primary LCD panel that is visible only when the phone is open (or unfolded), and a secondary LCD panel that remains exposed even when the phone is folded. The secondary LCD panel is typically smaller than the primary LCD panel and displays limited information. Usually, the secondary panel displays information that users would want to see without unfolding the phone (e.g., time, message alert).

Generally, the primary LCD and the secondary LCD each has its own driver chip, resulting at least two separate chips per phone. This use of two or more different chips is economically disadvantageous, both from a circuit design perspective and a manufacturing cost perspective. To reduce this economic inefficiency, much research effort has been geared to designing a chip that can drive both LCD panels.

FIG. 16 is a partial view of a currently existing driver chip 50 that is designed to control multiple display panels. The Figure shows 12 contact pads 60 (herein also referred to as "terminals") arranged along a first edge 52 of the driver chip 50 and eight contact pads 60 arranged along a second edge 54 of the driver chip 50. The contact pads 60 are categorizable into three groups: the data signal contact pads 62, the first gate signal contact pads 64, and the second gate signal contact pads 66. As is well known, the number of contact pads determines the resolution of the display panel; hence, the more contact pads there are, the higher the resolution. Although it is desirable to increase the resolution of the display panel by increasing the number of contact pads, increasing the number of contact pads is undesirable because it leads to a larger driver chip 50 and therefore a larger device. Since the contact pads are spaced apart by a minimum distance to achieve a desired level of reliability and quality, it is equally undesirable to try to increase the number of contact pads without increasing the size of the driver chip 50. Due to these limitations, the currently available driver chip 50 is only usable with low-resolution displays.

A driver chip that can control multiple display panels including at least one high-resolution display without the attendant increase in chip size is desired.

SUMMARY

The invention provides a way to produce a high-resolution display device without significant increase in driver chip size. In one aspect, the invention is electronic device that includes a display area having a plurality of gate lines and a plurality of data lines, a peripheral region surrounding the display area, a gate driver formed in the peripheral region, wherein the first gate driver provides gate signals to the gate lines, and a driver chip spaced apart from the gate driver. The driver chip generates a plurality of gate control signals for the gate driver. In addition, the driver chip generates data signals for the data lines.

In another aspect, the invention is a driver chip set for use with an electronic device having a display panel. The chip set includes an integrated circuit chip and a gate driver that is outside the integrated circuit chip. The integrated circuit chip has an input terminal for receiving an input data signal and an input control signal, a control section coupled to the input terminal for converting the input data signal to data signals and converting the input control signal to gate control signals, a plurality of data signal output terminals coupled to the control section for transmitting the data signals. As for the gate driver, it applies gate signals to gate lines in response to the gate control signals from the driver chip.

The invention further includes a display panel driver chip having a rectangular surface, wherein the chip receives input signals from a CPU and outputs signals to data lines, a first set of gate lines for the first display panel, and a second set of gate lines for the second display panel.

In yet another aspect, the invention includes specific arrangements of input terminals and output terminals on the rectangular surface of the driver chip to accommodate the data lines and gate lines of a high-resolution display panel.

DETAILED DESCRIPTION OF THE PREFERRED EMBODIMENTS

Embodiments of the invention are described herein in the context of display devices and more specifically in the context of dual-display-panel wireless phones. However, it is to be understood that the embodiments provided herein are just preferred embodiments, and the scope of the invention is not limited to the applications or the embodiments disclosed herein. For example, the invention may be adapted to any device or usage including at least one display panel.

Conventional driver chips include input terminals for receiving signals from a CPU and output pads for driving the gate lines and the data lines (control signals, data signals, and gate line voltages). As the display resolution gets higher, the number of gate lines and data lines also increase, requiring more terminals on the driver chip. Due to the limit on the number of terminals that can fit into a given-sized chip, the chip size limit is essentially a limit on the display panel resolution.

The driver chip of the invention controls high-resolution display panels without the usually-attendant increase in size. The chip driver of the operates a greater number of gate lines and data lines by transferring some of the gate driving function to a gate driver formed in the peripheral region of the display panel, for example in the form of flip flops. The driver chip of the invention sends clock signals (CK, CKB) and start signals (ST) to the gate driver but do not apply gate signals to the gate lines. By limiting the gate driving function of the chip driver this way, fewer terminals are needed for gate driving, and chip real estate is freed up to be used for more data lines. Source and ground voltages are fed to the gate driver separately from the gate control signals.

The gate driver in the peripheral region of the display device may be built with amorphous silicon thin film transistors for integration into the display panel. Further details about amorphous silicon thin film transistor LCD devices are disclosed in U.S. Publication No. 2003/0222311 published on Dec. 4, 2003, which is incorporated herein by reference in its entirety.

Figure 1:
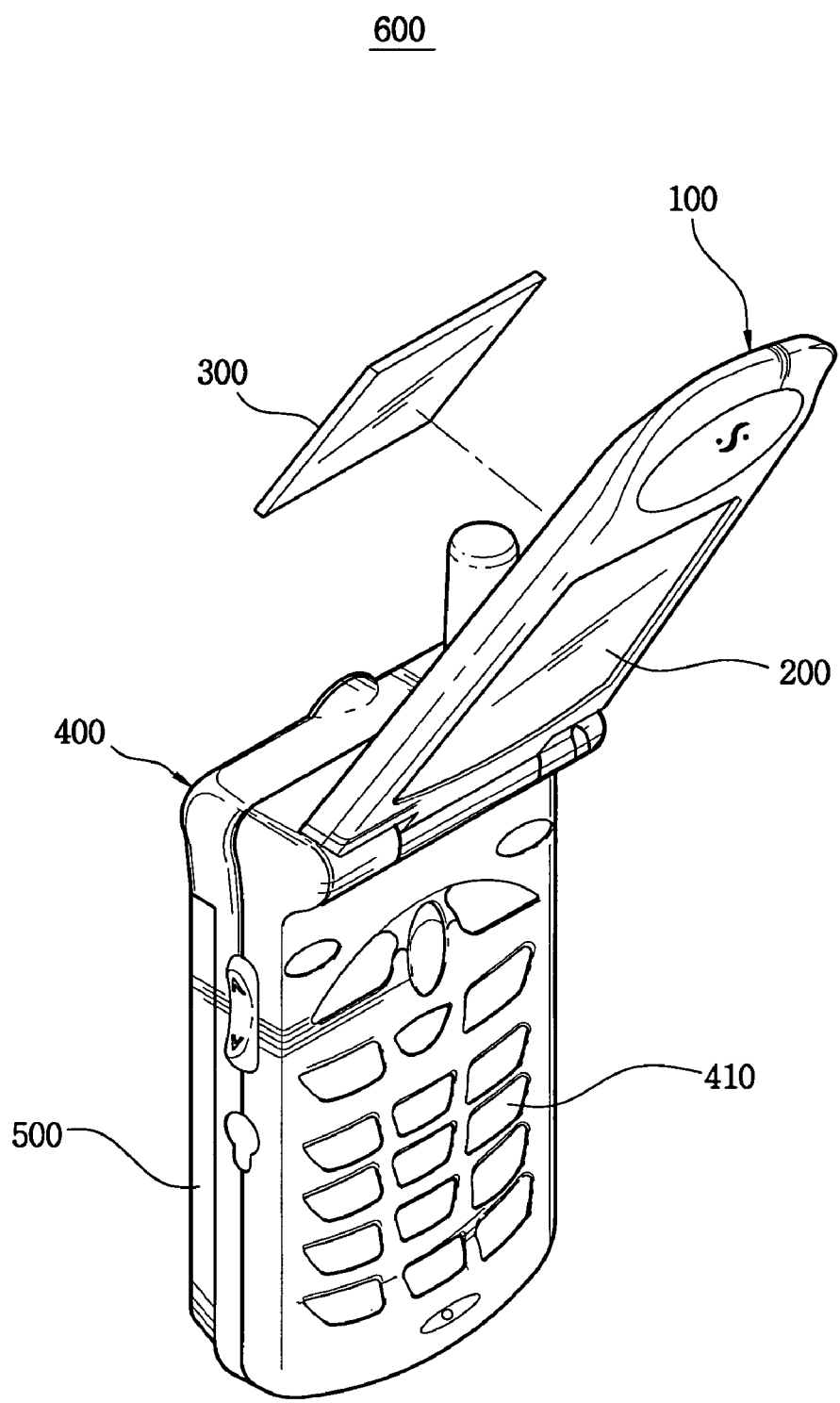
FIG. 1 is a perspective view of an exemplary electronic device including multiple display panels.

FIG. 1 is a perspective view of an exemplary electronic device 600 including a display module 100 connected to a control module 400. The electronic device 600 is powered by a battery 500. The display module 100, which displays information, includes a primary display panel 200 and a secondary display panel 300. As mentioned above, the primary display panel 200 is usually only viewable when the electronic device 600 is open, or unfolded, as shown in FIG. 1. The secondary display panel 300, on the other hand, is viewable even when the phone is closed or folded. The battery 500 is detachably attached to the control module 400, and may be any form of power supply device.

The control module 400 has keys 410 that a user can use to input information. The control module 400 generates signals in response to user input and provides the signals to the primary display panel 200. The primary display panel 200 displays images that reflect the user input.

Typically, the primary display panel 200 displays main information and the secondary display panel 300 displays only stand-by information such as time and date. "Stand-by information" is information that is displayed independently of user input. Due to this different usage of the two panels, the primary display panel 200 is larger than the secondary display panel 300 and has a higher resolution. For example, the resolution of the primary display panel 200 may be 128×160 and the resolution of the secondary panel may be 96×64.

Figure 2:
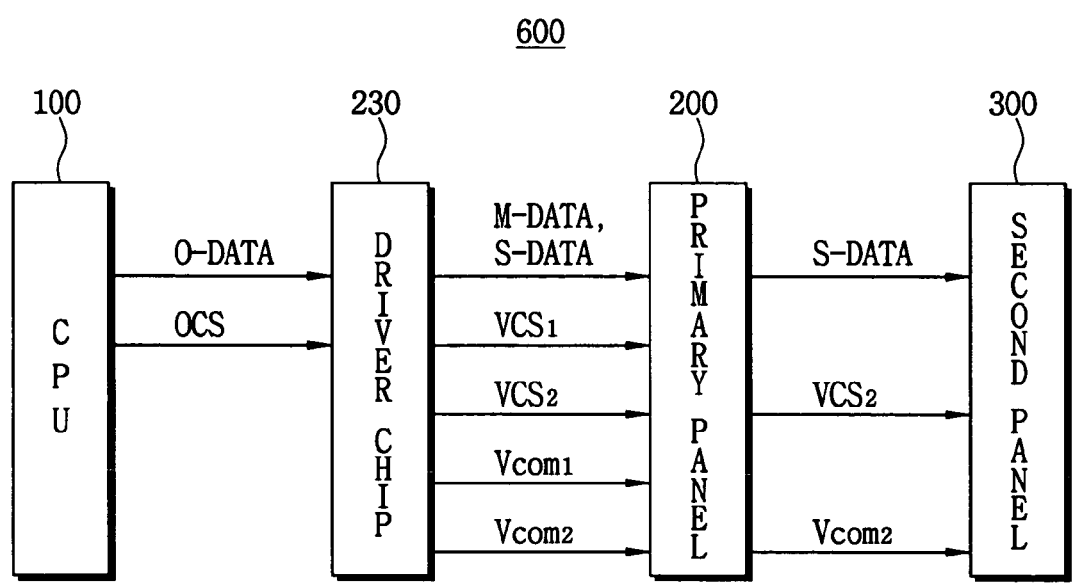
FIG. 2 is a block diagram of the control configuration for the electronic device of FIG. 1.

FIG. 2 is a block diagram of the control configuration of the electronic device 600 according to an exemplary embodiment of the present invention. In more detail, the electronic device 600 includes the primary display panel 200, the secondary display panel 300, and a driver 230 for driving the two panels 200, 300. The driver 230 receives an original data signal O-DATA and an original control signal OCS from a CPU 100. The original data signal O-DATA includes data signals for colors red (R), green (G), and blue (B). The original control signal OCS includes a vertical synchronous signal Vsync, a horizontal synchronous signal Hsync, and a main clock signal MCLK.

The driver 230 outputs various signals for driving the primary and secondary panels 200, 300, in response to the original data signal O-DATA and the control signals OCS. In more detail, the driver 230 converts the original data signal O-DATA and the original control signal OCS to a first data signal M-DATA, a second data signal S-DATA, first and second vertical control signals VCS1 and VCS2, and first and second common voltages Vcom1 and Vcom2. These signals are selectively forwarded to the primary display panel 200 and the secondary display panel 300.

As shown, the primary display panel 200 receives the first and second data signals M-DATA and S-DATA from the driver 230. The primary display panel 200 also receives the first and the second vertical control signals from the driver 230. While the primary display panel 200 displays information according to the first data signals M-DATA, it transfers the second data signals S-DATA to the secondary display panel 300 without displaying them as images. The secondary display panel 300 displays the images that correspond to the second data signals S-DATA.

Similarly, the primary display panel 200 filters out the first vertical control signal VCS1 and the first common voltage Vcom1, passing only the second vertical control signal VCS2 and the second common voltage Vcom2 to the secondary display panel 300. Thus, the secondary display panel 300 receives only the data that is intended for it.

A first gate driver (indicated with reference numeral 240 in FIGS. 3, 5, 9, and 13 below) is formed on the primary display panel 200, and a second gate driver (indicated with reference numeral 310 in FIGS. 3, 7, 9, and 13 below) may be formed on the secondary display panel 300. The first gate driver 240 receives the first gate control signal (VCS1) from the driver chip 230 and outputs a first gate signal in response to the first gate control signal (VCS1). Similarly, the second gate driver 310 receives the second gate control signal (VCS2) from the driver chip 230 and outputs a second gate signal in response to the second gate control signal (VCS2). These first and second gate signals are applied to the gate lines in the first and second display panels 200, 300, respectively. Also, the first and second common voltages Vcom1 and Vcom2 output from the driver 230 are applied to the primary and secondary panels 200, 300, respectively.

The "gate control signal" used herein is sometimes referred to as a vertical control signal. A gate control signal includes a start signal (ST), a first clock signal (CK), and a second clock signal (CKB). The first clock signal and the second clock signals are based on the main clock signals in the input signal OCS. A gate driver generates gate signals in response to a gate control signal and according to the clock signals. The "data control signal" used herein is sometimes referred to as the "horizontal control signal," and control the data lines.

By using the configuration that is illustrated in FIG. 2, the invention allows the driver chip 230 to drive more gate lines and data lines than a conventional driver chip. The configuration of FIG. 2 also includes one or more gate drivers formed in the peripheral region of the display panels. The driver chip 230 controls the gate drivers with gate control signals. The driving chip 230 is especially valuable for applications where size is an important feature of the product, such as wireless electronic devices, because it is able to operate high-resolution displays without an attendant increase in chip size. For example, the driver chip 230 having a size comparable to a conventional driver chip can be used for a wireless phone having a primary display panel 200 with a resolution of 176×220 and a secondary display panel with a resolution of 96×64 (or 64×96).

Numerous embodiments of the driver 230 are possible, only some of which will be illustrated herein. In the interest of clarity, the components of the different embodiments will be described with an alphabetic indicator attached to the reference numeral. Four embodiments of the driver 230 will be referred to as the driver 230a, 230b, 230c, and 230d.

Figure 3:
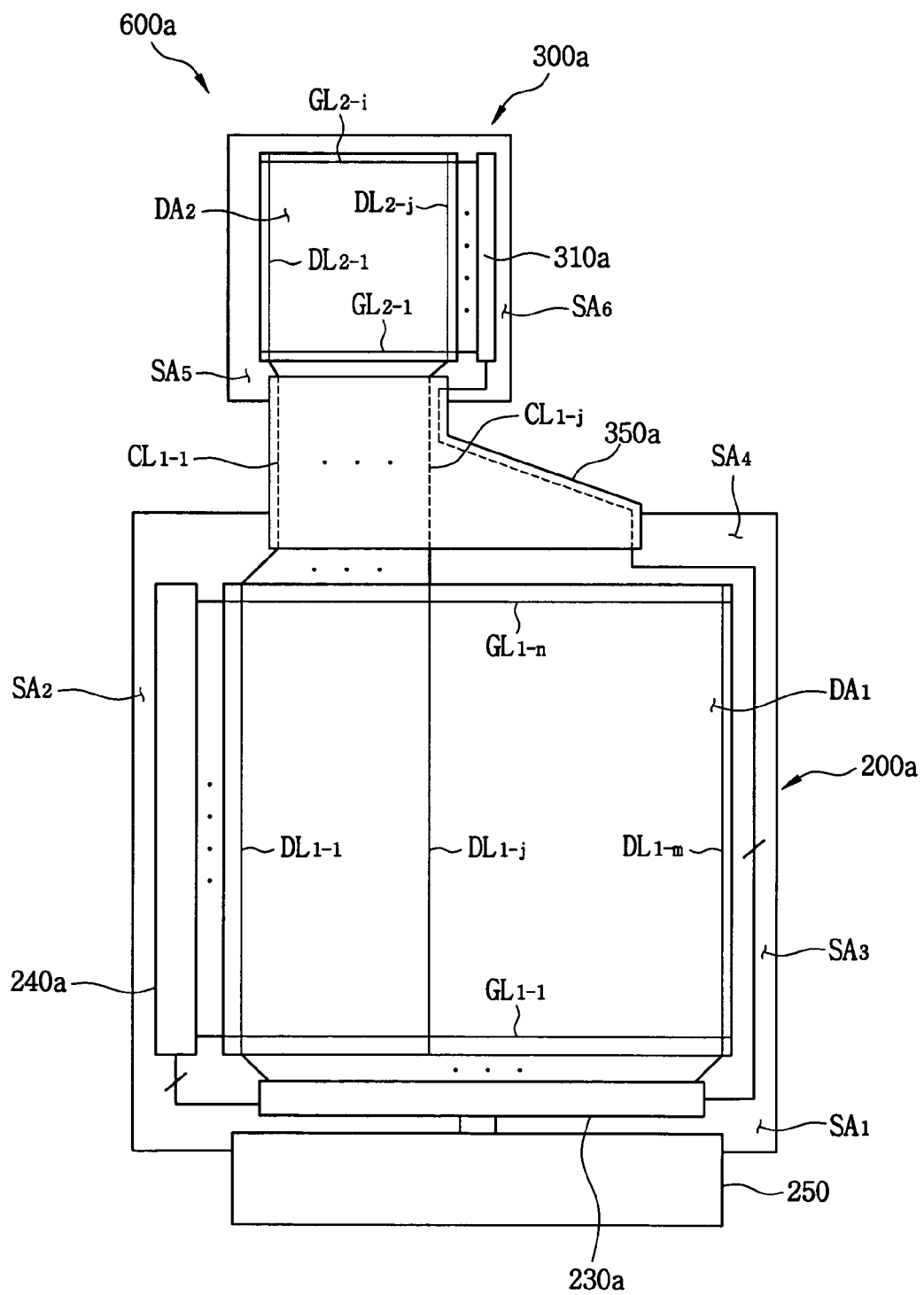
FIG. 3 is a schematic view of an electronic device including a first embodiment of the invention.

FIG. 3 is a schematic view of the electronic device 600a. As shown, the primary display panel 200a includes a first display area $DA_1$ surrounded by a first peripheral region. The first peripheral region is made of a first sub-region SA1, a second sub-region SA2, a third sub-region SA3, and fourth sub-region SA4. The first display area $DA_1$ is coupled to the CPU 100 (shown in FIG. 2) with a first printed circuit board 250 and coupled to a second display area $DA_2$ with a second printed circuit board 350a. The second display area $DA_2$ is surrounded by a second peripheral region, which is made of a fifth sub-region SA5 and a sixth sub-region SA6.

The first display area $DA_1$ has n first gate lines that are shown in the Figure as $GL_{1-1}$ to $GL_{1-n}$, and m first data lines that are shown as $DL_{1-1}$ to $DL_{1-m}$. The first gate lines extend in a first direction, and the first data lines extend in a second direction that is substantially perpendicular to the first direction.

The second display area $DA_2$ has i second gate lines, shown in the Figure as $GL_{2-1}$ to $GL_{2-i}$, and j second data lines that are shown as $DL_{2-1}$ to $DL_{2-j}$. The second gate lines extend in a third direction, and the second data lines extend in a fourth direction that is substantially perpendicular to the third direction.

The primary display panel 200a is larger than the secondary display panel 300a, and the first display area $DA_1$ is larger than the second display area $DA_2$. Further, the first display area $DA_1$ has a higher resolution than the second display area $DA_2$. Accordingly, the number of gate lines and data lines generally follow the pattern set forth below:

n, m, i, j are each a natural number equal to or greater than 2 i≦n j≦m

A driver 230a for driving the primary display panel 200 and the secondary display panel 300 are mounted on the first sub-region SA1. The first flexible printed circuit board 250, which is electrically connected to the driver 230a, forwards the original data signal O-DATA and the original control signal OCS from the CPU 100 (see FIG. 2) to the driver 230a.

A first gate driver 240a is formed in the first peripheral region. In the particular embodiment shown, the first gate driver 240a is formed in the second sub-region SA2, and is configured to receive signals from the driver 230a and distribute the first gate signals to the first gate lines $GL_{1-1}$ to $GL_{1-n}$. A second gate driver 310a is formed in the second peripheral region. The second gate driver 310a, which is formed in the sixth sub-region SA6, is configured to receive signals from the driver 230a and distribute the second gate signals to the second gate lines $GL_{2-1}$ to $GL_{2-i}$.

Figure 4:
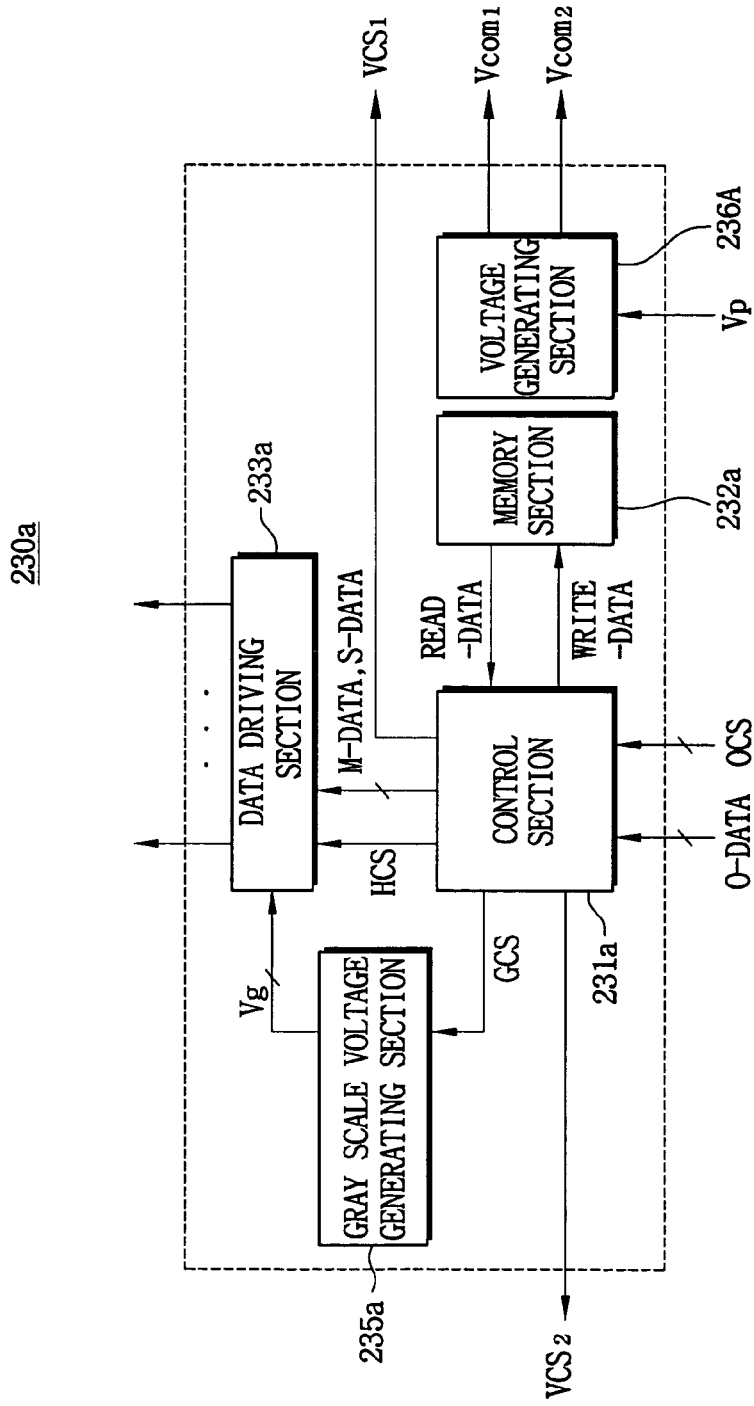
FIG. 4 is a block diagram of the driver of FIG. 3.

FIG. 4 is a block diagram of the driver 230a shown in FIG. 3. As shown, the driver 230a includes a control section 231a, a memory section 232a, a data driving section 233a, a gray scale voltage generating section 235a, and a voltage generating section 236a. The control section 231a receives the data signals O-DATA and the original control signal OCS from the CPU 100 (see FIG. 2), and provides the received signals to the memory section 232a. The memory section 232a stores the original data signal O-DATA (WRITE DATA). Then, the control section 231a reads the first and second data signals M-DATA and S-DATA from the memory section 232a, line by line, in response to the control signals OCS (READ DATA).

The control section 231a outputs the first and second data signals M-DATA and S-DATA read from the memory section 232a. The control section 231a also outputs a data control signal (HCS) to the data driving section 233a, and outputs a first and second gate control signals (VCS1 and VCS2) to the gate drivers 240a and 310a. Although not shown in FIG. 4, the control section 231a includes a timing section that generates clock signals CK and CKB. The control section 231a also outputs a gray scale control signal (GCS) to the gray scale voltage generating section 235a.

The gray scale voltage generating section 235a outputs gray scale voltage Vg in response to the gray scale control signal GCS provided from the control section 232. The data driving section 233a requires the gray scale voltage Vg corresponding to a number of bits of first and second data signals M-DATA and S-DATA provided from the control section 231a. For example, when the first data signal M-DATA or the second data signal S-DATA corresponds to 6 bits, the gray scale voltage generating section 235a generates 64 (=$2^6$) gray scale voltages Vg. The data driving section 233 outputs the first data signal M-DATA or the second data signal S-DATA in response to the data control signal (HCS), using the gray scale voltage Vg.

The voltage generating section 236a receives a source voltage Vp from an external device and adjusts the source voltage Vp to output first and second common voltages $V_{com1}$ and $V_{com2}$. The common voltages $V_{com1}$ and $V_{com2}$ are then forwarded to the primary and the secondary panels 200, 300. The voltage generating section 236a may output a first driving voltage for driving the control section 231a, a second driving voltage for driving the data driving section 233a, a third driving voltage for driving the first gate driver 240a, and a fourth driving voltage for driving the second gate driver 310a.

Referring back to FIG. 3, the first gate driver 240a that is formed in the second sub-region SA2 of the first peripheral region applies the first gate signal to the first gate lines $GL_{1-1}$ to $GL_{1-n}$ in response to the first vertical control signal VCS1 from the driver 230a. Similarly, the second gate driver 310a that is formed in the sixth sub-region SA6 of the second peripheral region applies the second gate signal to the second gate lines $GL_{2-1}$ to $GL_{2-i}$, in response to the second vertical control signal VCS2 from the driver 230.

A second printed circuit board 350 electrically connects the primary display panel 200 and the secondary display panel 300. A first end of the second flexible printed circuit board 350 is attached at the fourth sub-region SA4 of the primary display panel 200, and a second end of the second flexible printed circuit board 350 is attached at the fifth sub-region SA5 of the secondary display panel 300. The second flexible printed circuit board 350 includes connection lines $CL_{1-1}$-$CL_{1-j}$ for electrically connecting $DL_{1-1}$ to $DL_{1-j}$ (i.e., a subgroup of the first data lines $DL_{1-x}$ to $DL_{1-m}$) to the second data lines $DL_{2-1}$ to $DL_{2-j}$.

The second flexible printed circuit board 350 keeps the driver 230a electrically connected with both the primary and the secondary display panels 200, 300 even when the driver chip 230 is directly physically attached to only the primary display panel 200. The second data signal S-DATA are transmitted to the second data lines $DL_{2-1}$ to $DL_{2-j}$ of the secondary display panel 300 via first data lines $DL_{1-1}$ to $DL_{1-j}$ and the connection lines $CL_{1-1}$ to $CL_{1-j}$. Likewise, the second vertical control signal VCS2 and the second common voltage $V_{com2}$ output from the driver 230a are transmitted to the secondary display panel 300 via the primary display panel 200 and the second flexible printed circuit board 350.

The driver 230a has an input terminal through which it receives the original data signal O-DATA and the original control signal OCS, and three sets of signal output terminals: a first set of output terminals for transmitting the data line signals, a second set of output terminals for transmitting the first gate signals, a third set of output terminals for transmitting the second gate signals. The driver 230a also includes voltage output terminals Vcom1 and Vcom2. Each "set" of output terminals includes at least one contact pad located on the chip surface.

As shown, one driver 230a drives both the primary display panel 200a and the secondary display panel 300a in the electronic device 600a. By moving the gate driving circuits out of the driver chip 230, valuable real estate in the driver chip 230 is freed up for data driving. Since the peripheral regions of the display panels were not used for any electrical connections, this "wasted space" is utilized by forming the first and second gate drivers 240a and 310a therein. The overall effect of moving the gate driving circuits from the driver chip to the peripheral region(s) is the ability to drive high-resolution display panels in a space-efficient manner.

Embodiment 1

FIGS. 5, 6, 7, 8A, and 8B pertain to the electronic device 600 including the first embodiment of the driver 230, referred to herein as the driver 230b. The same reference numerals are used to indicate components that are similar to the components that are described above. However, the alphabetic indicator "b" will be attached to the components of this embodiment for clarity. The gray scale voltage generating section 235 and voltage generating section 236 are omitted in FIG. 7 for clarity of illustration.

The driver 230b has three output terminals. However, unlike the driver 230a, which had two gate drivers 240a, 310a that were located external to the driver chip 230a, only a part of the gate driver is external to the driver 230b. The electronic device 600b has a first gate driver 240b that is formed in the first peripheral region and a second gate driver 234b that is integrated into the driver 230b.

Figure 5:
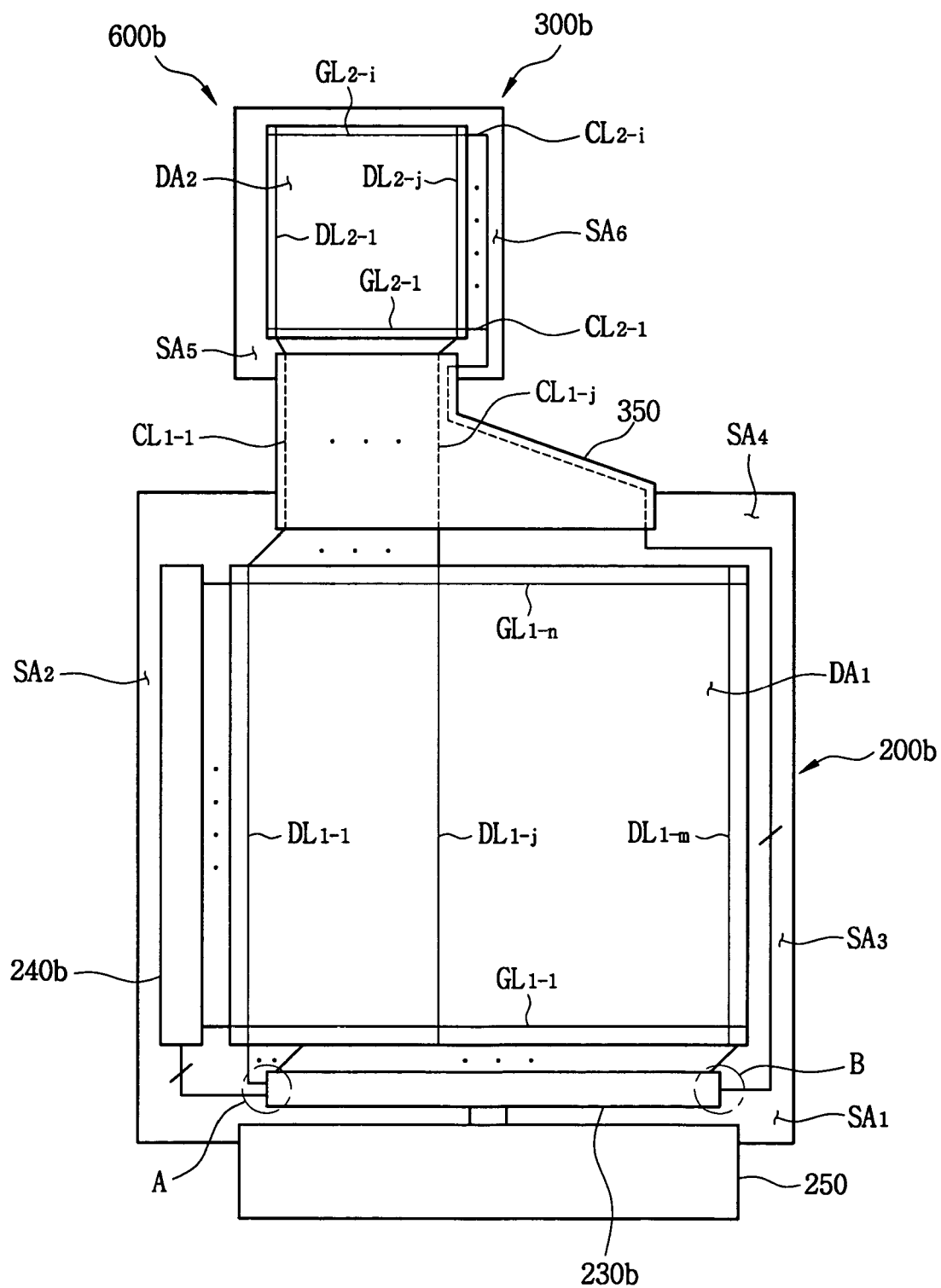
FIG. 5 is a schematic diagram of an electronic device including a second embodiment of the invention.

FIG. 5 is a schematic view of the primary and secondary display panels 200, 300 that are operated by the driver 230b. As in the embodiment described above, the primary display panel 200 has first gate lines $GL_{1-1}$ to $GL_{1-n}$ and first data lines $DL_{1-1}$ to $DL_{1-m}$. The driver 230b receives signals from the CPU 100 (see FIG. 2) via the first printed circuit board 250 and outputs different data line signals for the first data lines $DL_{1-1}$ to $DL_{1-m}$. As for the gate lines $GL_{1-1}$ to $GL_{1-n}$, the driver 230b forwards the gate line signals to the first gate driver 240b, which then distributes the signals to the gate lines $GL_{1-1}$ to $GL_{1-n}$.

The secondary display panel 300b is also driven by the driver 230b. A subgroup of the first data lines, namely $DL_{1-1}$ to $DL_{1-j}$, are electrically coupled to the second data lines $DL_{2-1}$ to $DL_{2-j}$ via the connection lines $CL_{1-1}$ to $CL_{1-j}$ on the second printed circuit board 350b. Signals are transmitted from the driver 230b to the second gate lines $GL_{2-1}$ to $GL_{2-i}$ via a path that runs along the third sub-region SA3, across the second printed circuit board 350, and along the sixth sub-region SA6. At the sixth sub-region SA6, the signals are distributed among the second connection lines $CL_{2-1}$ to $CL_{2-j}$, which respectively couple to the second gate lines $GL_{2-1}$ to $GL_{2-i}$.

Figure 6A:
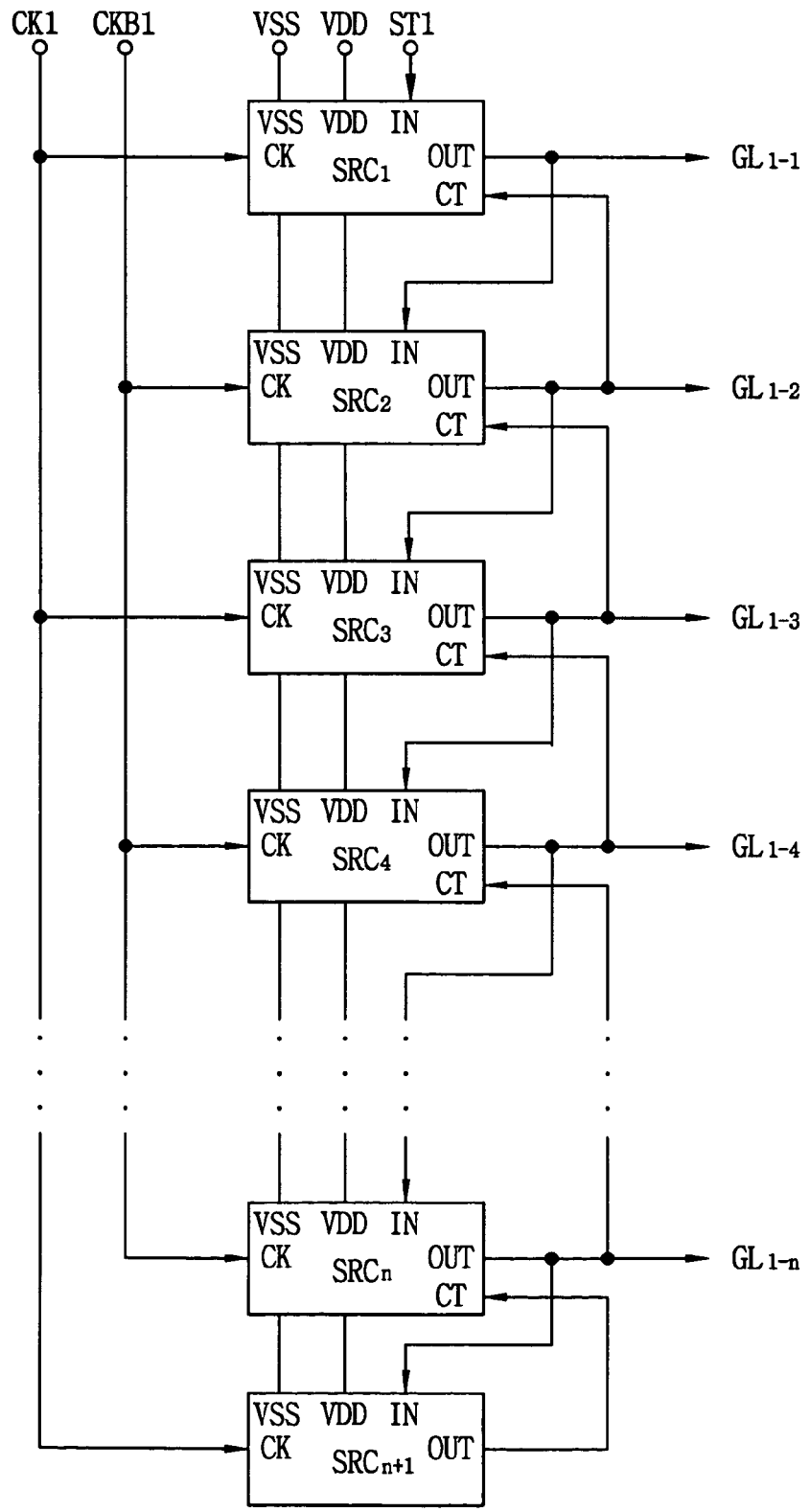
FIG. 6A is a schematic diagram of the first gate driver that may be used with the embodiment of FIG. 5.

FIG. 6A is a schematic diagram of the first gate driver 240b in accordance with the first embodiment. The first gate driver 240b is electrically connected to the first gate lines $GL_{1-1}$ to $GL_{1-n}$, and provides the first gate lines $GL_{1-1}$ to $GL_{1-n}$ with a first gate signal in sequence. The first gate driver 240b includes a shift register having (n+1) number of states, $SRC_1$ to $SRC_{n+1}$, that are electrically connected to each other. Each state has an input terminal IN, an output terminal OUT, and a control terminal CT. An output terminal OUT of a stage is electrically connected to the control terminal CT of the previous stage and an input terminal IN of the succeeding stage.

The first start signal ST1 is applied to the first stage $SRC_1$. In addition to the start signal ST1, the first gate driver 240b receives a first clock signal CK1, a second clock signal CKB1, a ground voltage $V_{SS}$ and a source voltage $V_{DD}$. The phase of the second clock signal CKB1 is inverse of the phase of the first clock signal CK1.

Figure 6B:
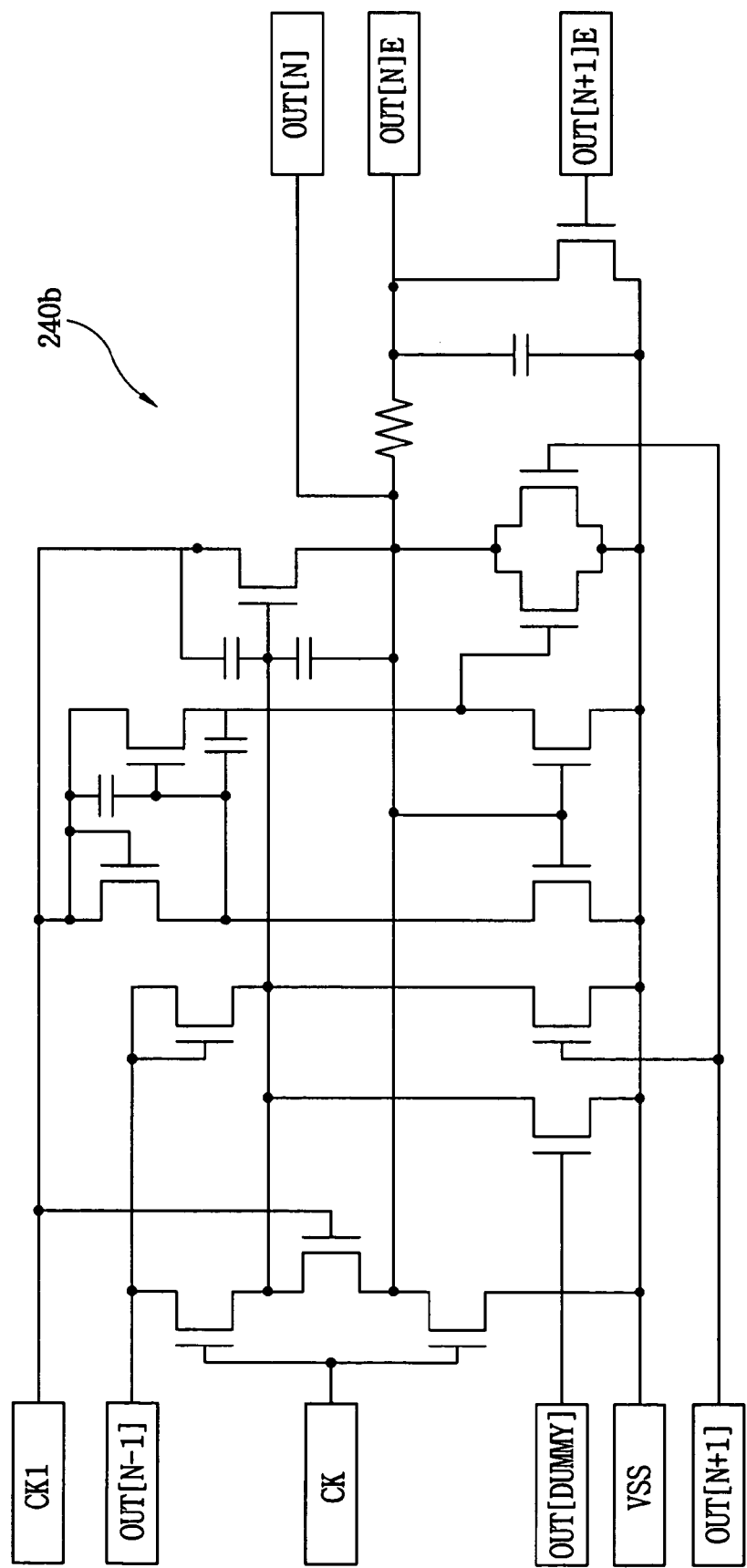
FIG. 6B is a circuit diagram illustrating one implementation of the first gate driver of FIG. 6A.

The odd numbered stages $SRC_1$, $SRC_3$, ... $SRC_{n+1}$ receive the first clock signal $CK_1$. The even numbered stages $SRC_2$, $SRC_4$, ... $SRC_n$ receive the second clock signal CKB1. When the first start signal ST1 is applied to the first stage SCR1, the first stage SCR1 outputs the first clock signal CK1 as a first gate signal. The second stage SCR2, upon receiving the first gate signal, outputs the second clock signal CKB1 as a second gate signal. FIG. 6B is a circuit diagram illustrating a possible implementation of the first gate driver 240b.

Figure 7:
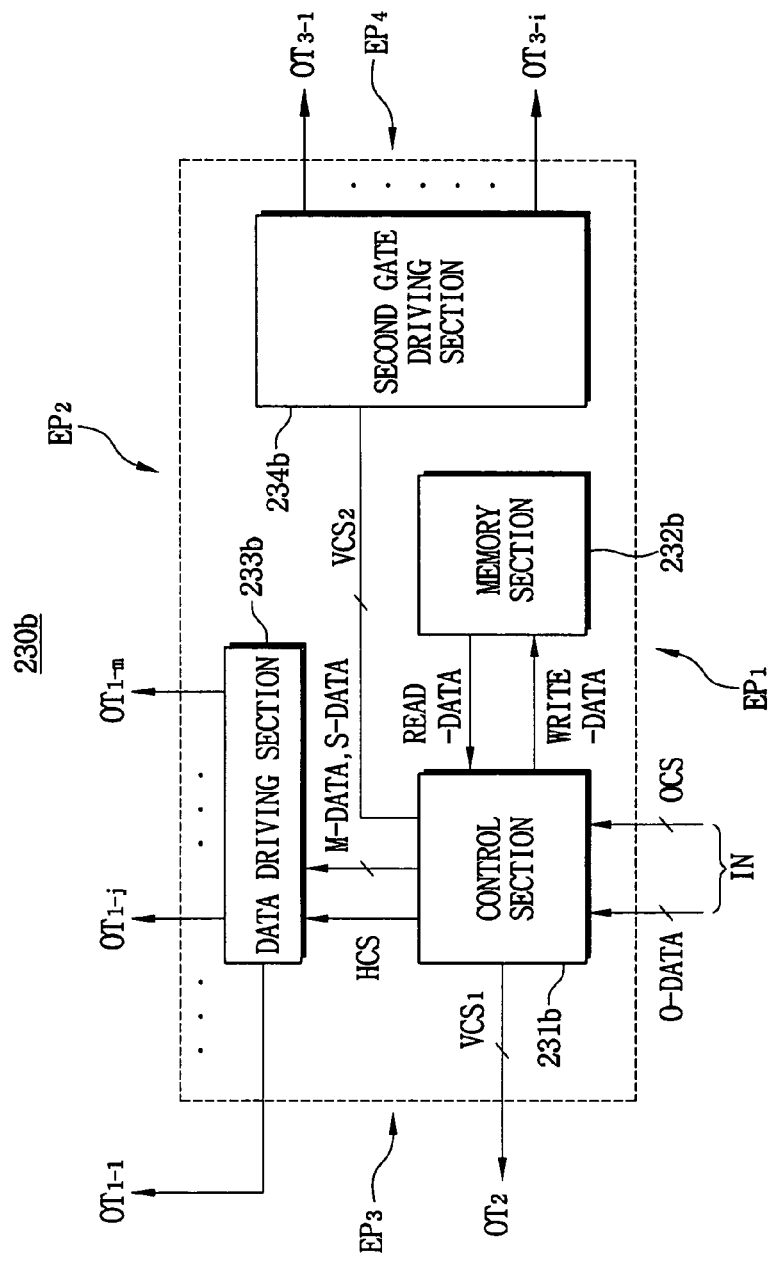
FIG. 7 is a block diagram of the driver of FIG. 5.

FIG. 7 is a block diagram of the driver chip 230b. The driver chip 230b includes a control section 231b, a memory section 232b, and a second gate driver 214b. In addition, the driver chip 230b includes a second gate driver 234b that is integrated into the driver chip 230b. The driver chip 230b receives an original data signal O-DATA and an original control signal OCS via an input terminal (IN). The original data signal O-DATA includes data for red, green, and blue pixels. The original control signal OCS includes a vertical synchronization signal, a horizontal synchronization signal, and a main clock.

As mentioned above, the driver 230b includes three sets of output terminals: data signal output terminals ($OT_{1-1}$ to $OT_{1-m}$), first gate control signal output terminal(s) ($OT_2$), and second gate control signal output terminal(s) ($OT_{3-1}$ to $OT_{3-i}$).

The driver 230b is a rectangular chip having four edge regions: a first edge region $EP_1$, a second edge region $EP_2$, a third edge region $EP_3$, and a fourth edge region $EP_4$. The contact pads in each edge region are arranged along the edge that defines the edge region. The edges near the first and second edge regions $EP_1$, $EP_2$ are parallel to each other, and the edges near the third and the fourth edge regions $EP_3$, $EP_4$ are parallel to each other. As shown, the input terminal IN is located near the first edge region $EP_1$. The data signal output terminals $OT_{1-1}$ to $OT_{1-m}$ are located near the second edge region $EP_2$, a first gate signal output terminal $OT_2$ is located near the third edge region $EP_3$, and a second gate signal output terminal $OT_3$ is located near the fourth edge region $EP_4$.

The control section 231b provides the original data signal O-DATA to the memory section 232b, which then stores the original data signal O-DATA. As mentioned above, the original data signal O-DATA includes the first data signals M-DATA and the second data signals S-DATA. The input control section 231b reads the first and second data signals M-DATA an S-DATA stored in the memory section 232b line by line, in response to the original control signal OCS, and forwards it to the data driving section 233b. The control section 231b also outputs the horizontal control signal HCS for controlling the data driving section 233b, so that the data driving section 233b knows when to transmit the first and second data signals M-DATA and S-DATA. In addition, the control section 231b outputs the first gate control signal (VCS1) for controlling the first gate driver 240b, and the second gate control signal (VCS2) for controlling the second gate driver 234b.

The data driving section 233b provides the first data signal M-DATA and the second data signals S-DATA to a set of data signal output terminals $OT_{1-1}$ to $OT_{1-m}$ in response to the data control signal HCS received from the control section 231b.

Figure 8A:
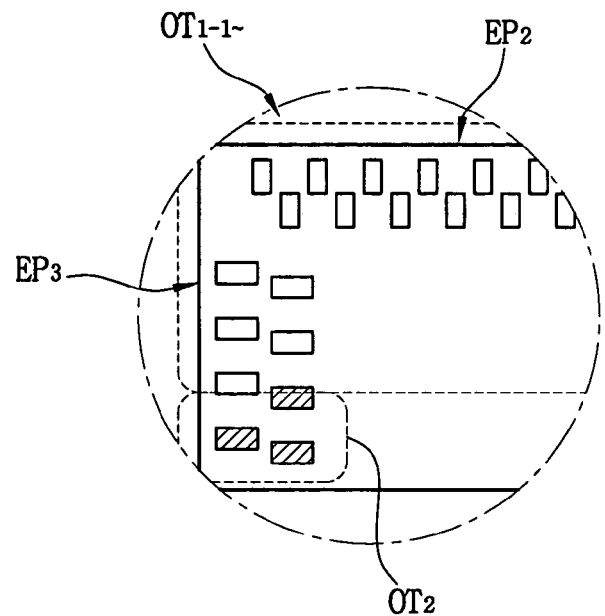
FIG. 8A and FIG. 8B are enlarged views of the driver of FIG. 5.
Figure 8B:
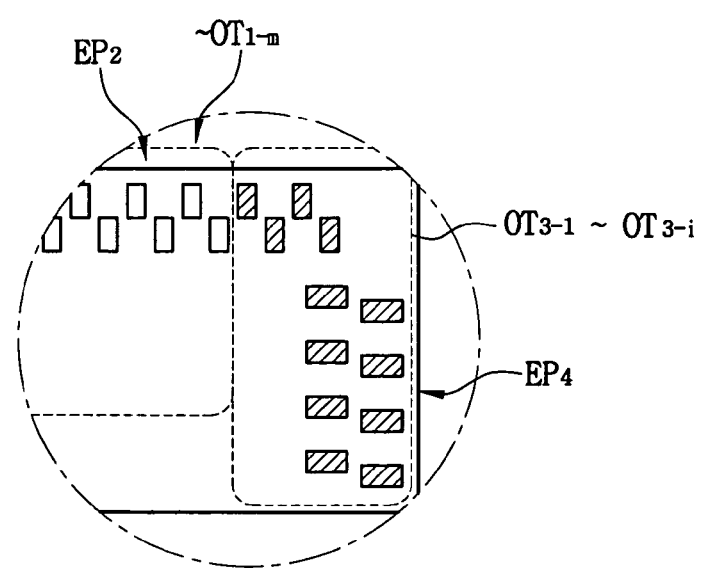

FIG. 8A and FIG. 8B are enlarged views of the portions labeled "A" and "B" in FIG. 5, respectively. As shown in FIG. 8A, a first group of the data signal output terminals $OT_{1-1}$ to $OT_{1-m}$ are disposed at the second edge region $EP_2$, and a second group of the data signal output terminals are disposed at the third edge region $EP_3$. As shown in FIGS. 5 and 7, the data signal output terminals $OT_{1-1}$ to $OT_{1-m}$ are electrically connected to the first data lines $DL_{1-1}$ to $DL_{1-m}$ at the first sub-region SA1. A subgroup of the first data lines $DL_{1-1}$ to $DL_{1-j}$ is electrically connected to the second data lines $DL_{2-1}$ to $DL_{2-j}$ via first connection lines $CL_{1-1}$ to $CL_{1-j}$. In more detail, the first connection lines $CL_{1-1}$ to $CL_{1-j}$ are electrically connected to the first data lines DL1-1 to DL1-j at the fourth sub-region SA4, and to the second data lines $DL_{2-1}$ to $DL_{2-j}$ at the fifth sub-region SA5.

Thus, the first data signal M-DATA output from the data driving section 233b is applied to the first data lines $DL_{1-1}$ to $DL_{1-m}$. The second data signal S-DATA is applied to the second data lines $DL_{2-1}$ to $DL_{2-j}$ via the first connection lines $CL_{1-1}$ to $CL_{1-j}$.

As shown in FIG. 8A, the driver chip 230b further includes first gate control signal output terminals $OT_2$ for outputting the first gate control signal (VCS1). In the particular embodiment, there is only one first gate control signal output terminal. The first gate signal output terminal $OT_2$ is disposed at the third edge region $EP_3$ of the driver chip 230b.

Referring to FIGS. 5 and 7, the second gate control signal output terminals $OT_{3-1}$ to $OT_{3-i}$ are electrically connected to the second connection lines $CL_{2-1}$ to $CL_{2-i}$. The second connection lines $CL_{2-1}$ to $CL_{2-i}$ extend from the second gate control signal output terminals $OT_{3-1}$ to $OT_{3-i}$ along the third peripheral portion SA3 and the second printed circuit board 350, to eventually couple to the second gate lines $GL_{2-1}$ to $GL_{2-i}$. Thus, the second gate control signal output from the second gate signal output terminals $OT_{3-1}$ to $OT_{3-i}$ is applied to the second gate lines $GL_{2-1}$ to $GL_{2-i}$ formed on the second display region $DA_2$.

In this embodiment, the second gate driver 234b is built into the driver 230b, resulting the same number of second gate signal output terminals $OT_{3-1}$ to $OT_{3-i}$ as the number of second gate lines $GL_{2-1}$ to $GL_{2-i}$. However, because the first gate driver 240b is located in the first peripheral region, there are fewer $OT_2$ output terminals than the number of gate lines in the first display area (n). Thus, the number of the data signal output terminals may be increased to enhance the resolution without necessarily enlarging the driver 230b. In the particular embodiment, the first gate driver 240b is external to the driver 230b. However, the invention is not so limited. In FIG. 8A and FIG. 8B, the second gate control signal output terminals ($OT_3$) are divided between the second edge region ($EP_2$) and the fourth edge region ($EP_4$).

An image is displayed in the second display region $DA_2$ when the second gate driving part 234b applies the second gate signals to the second gate signal output terminals $OT_{3-1}$ to $OT_{3-i}$ in response to the second vertical control signal VCS2. As mentioned above, the second display region $DA_2$ receives its data line signals from the connecting lines $CL_{1-1}$ to $CL_{1-j}$.

Not shown in FIGS. 5 and 7, the driver chip 230b may further include a DC/DC converting section and a voltage applying section with a common voltage source. The DC/DC converting section receives a voltage and lowers the voltage to a predetermined level for application of the voltage to the control section 231b, the data driving section 233b, the common voltage source, and the first and second gate drivers 240b and 234b. The common voltage outputs first and second common voltages that are applied to the first display region $DA_1$ and the second display region $DA_2$, respectively.

Embodiment 2

FIG. 9, FIG. 10, FIG. 11, FIG. 12A and FIG. 12B pertain to the electronic device 600c including a second embodiment of the driver 230, herein referred to as the driver 230c. The driver 230c is similar to the driver 230b described above in that it also has three sets of output terminals. However, unlike the driver 230b, there is no second gate driver (reference numeral 234b in FIG. 7) that is integrated into the driver chip. Instead of the second gate driver that is integrated into the driver 230b of Embodiment 1, the driver 230c uses the second gate driver 310c that is located in the second peripheral region for distributing the gate signals to the second display panel 300c.

Figure 9:
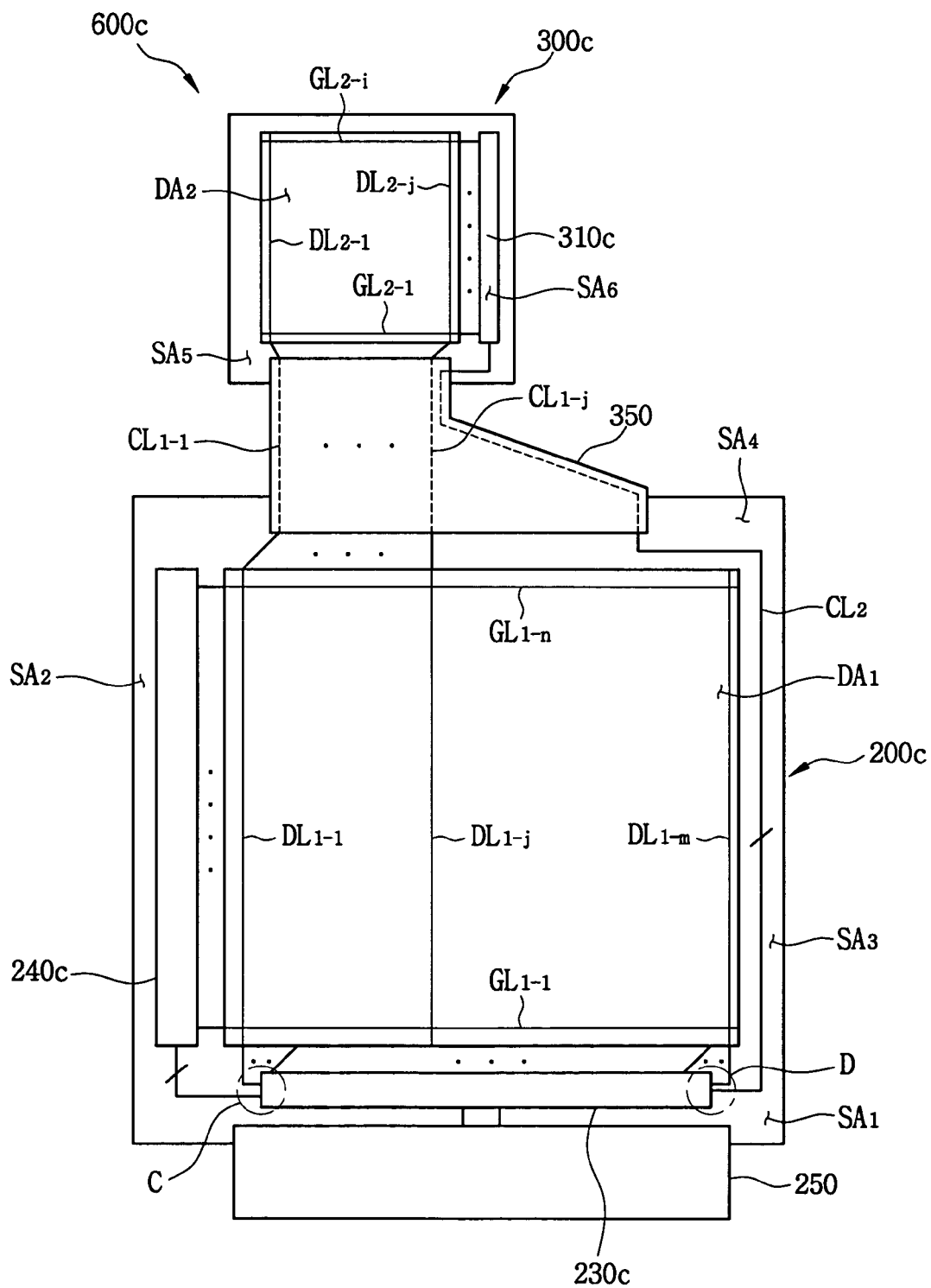
FIG. 9 is a schematic diagram of an electronic device including a third embodiment of the invention.

FIG. 9 is a schematic view of the primary and secondary display panels 200c, 300c that are operated by the driver 230c. As in the embodiment described above, the primary display panel 200 has first gate lines $GL_{1-1}$ to $GL_{1-n}$ and first data lines $DL_{1-1}$ to $DL_{1-m}$. The driver 230c receives signals from the CPU 100 (see FIG. 2) via the first printed circuit board 250 and outputs different data line signals for the first data lines $DL_{1-1}$ to $DL_{1-m}$. As for the gate lines $GL_{1-1}$ to $GL_{1-n}$, the driver 230b forwards the gate line signals to the first gate driver 240b, which then distributes the signals to the gate lines $GL_{1-1}$ to $GL_{1-n}$.

The secondary display panel 300 is also driven by the driver 230c. As in Embodiment 1, a subgroup of the first data lines, namely $DL_{1-1}$ to $DL_{1-j}$, are electrically coupled to the second data lines $DL_{2-1}$ to $DL_{2-j}$ via the connection lines $CL_{2-1}$ to $CL_{2-j}$ on the second printed circuit board 350. Signals are transmitted from the driver 230b to the second gate lines $GL_{2-1}$ to $GL_{2-i}$ in a different manner than in Embodiment 1. Instead of exiting the driver 230c as pre-divided gate lines as in Embodiment 1, the signals for the second gate lines are transmitted via a connecting line $CL_2$ that runs along the third sub-region SA3, across the second printed circuit board 350, and into the second gate driver 310b. The second gate driver 310b is located in the sixth sub-region SA6. The signals are distributed among the second connection lines $CL_{2-1}$ to $CL_{2-i}$ at the second gate driver 310c. The second connection lines $CL_{2-1}$ to $CL_{2-i}$ couple to the signals to the respective second gate lines $GL_{2-1}$ to $GL_{2-i}$.

Figure 10:
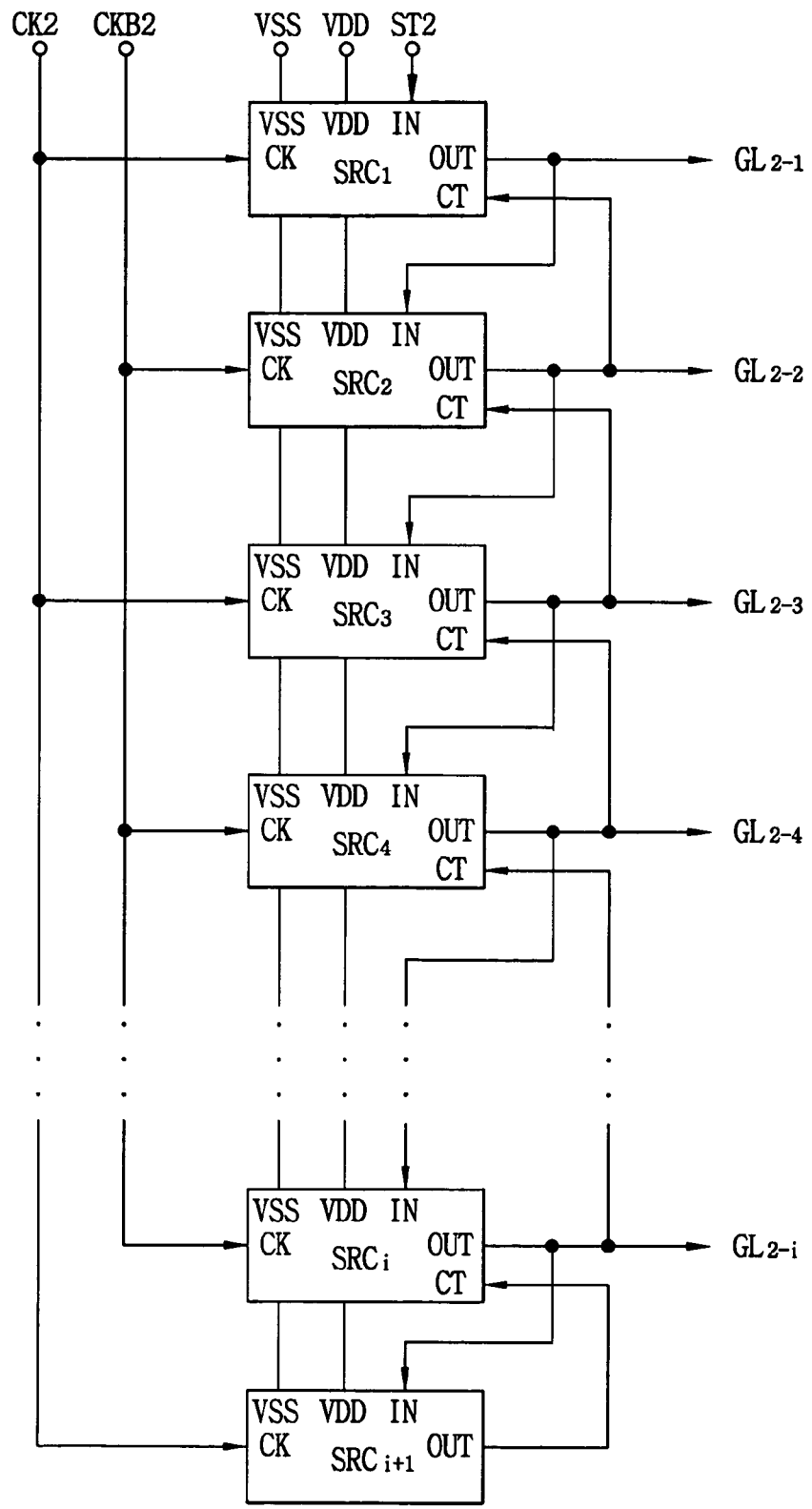
FIG. 10 is a schematic diagram of the second gate driver that may be used with the embodiment of FIG. 9.

As shown in FIG. 10, the second gate driver 310c is electrically connected to the second gate lines $GL_{2-1}$ to $GL_{2-i}$ for coupling the second gate signals to the second gate lines $GL_{2-1}$ to $GL_{2-i}$ in sequence. The second gate driver 310c includes a shift register having (i+1) number of stages $SRC_1$ to $SRC_{i+1}$, wherein the stages are electrically connected to each other. Specifically, an output terminal OUT of a stage is electrically connected to a control terminal CT of a previous stage and an input terminal IN of a next stage.

The second gate driver 310c is electrically connected to terminals for receiving a second start signal ST2, a third clock signal CK2, a fourth clock signal CKB2 having a phase that is inverse to that of the third clock signal CK2, a ground voltage $V_{SS}$ and a source voltage $V_{DD}$.

The third clock signal CK2 is applied to odd numbered stages $SRC_1$, $SRC_3$, ... $CRC_{n+1}$ while the fourth clock signal CKB2 is applied to even numbered stages $SRC_2$, $SRC_4$, ..., $SRC_n$. The second start signal ST2 is applied to the first and last stages $SRC_1$ and $SRC_{n+1}$.

When the second start signal ST2 is applied to the first stage $SRC_1$, the first stage $SRC_1$ outputs the third clock signal CK2 as a first gate signal. Then, the second stage $SRC_2$ receives the first gate signal from the first stage $SRC_1$, and the second stage $SRC_2$ outputs the fourth clock CKB2 as the first gate signal. Thus, i-number of stages $SRC_1$ to $SRC_i$ outputs the first gate signal in sequence.

Figure 11:
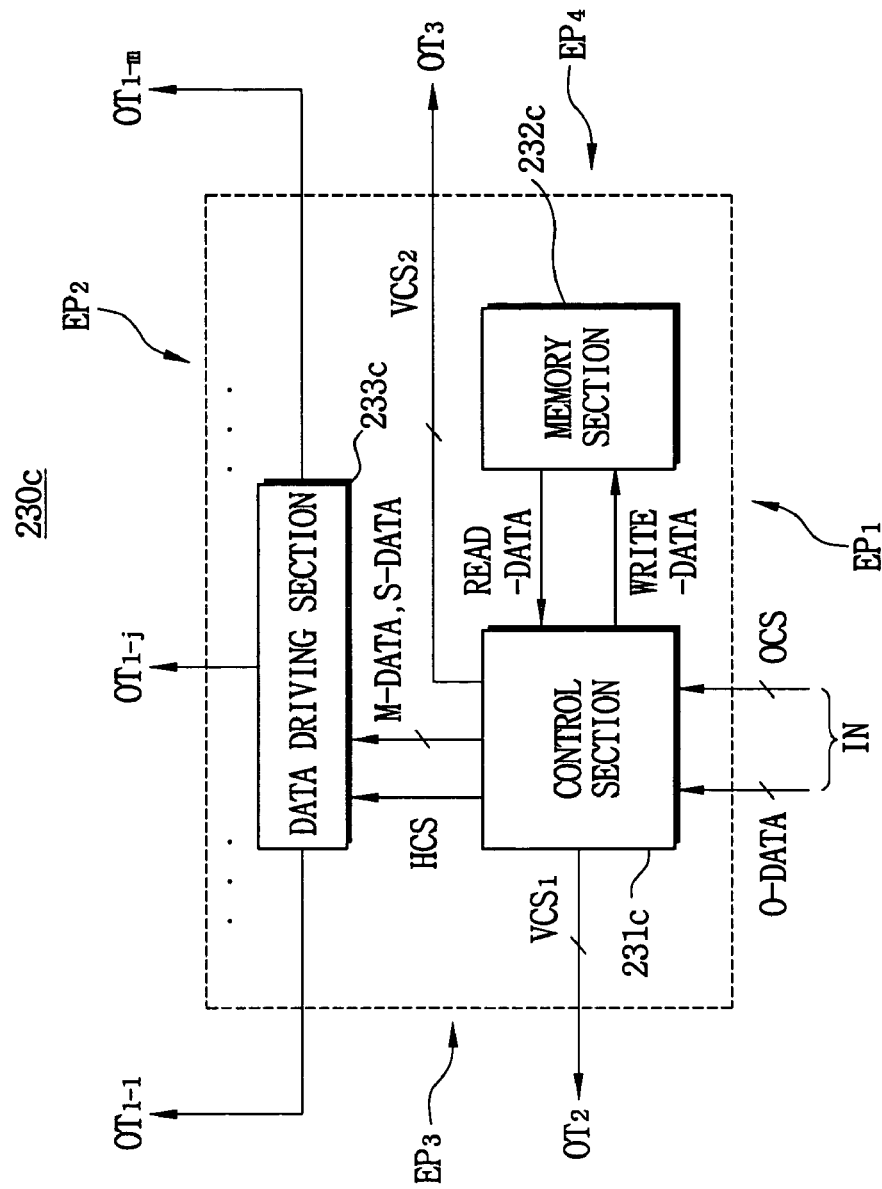
FIG. 11 is a block diagram of the driver of FIG. 9.

FIG. 11 is a block diagram of the driver 230c of FIG. 9. The original data signal O-DATA and the original control signal OCS are applied to an input terminal IN of the driver 230c. The driver 230c is a rectangular-shaped chip having a first, second, third, and fourth edge regions $EP_1$, $EP_2$, $EP_3$, and $EP_4$ that are defined by the four edges of the chip surface. The first and second edge regions $EP_1$ and $EP_2$ are near edges that are substantially parallel to each other, and the third and the fourth edge regions $EP_3$ and $EP_4$ are near edges that are substantially parallel to each other. The input terminal IN is formed near the first edge region $EP_1$ in this embodiment, as shown in FIG. 11.

The control section 231c provides the memory section 232c with the original data signal O-DATA, so that the memory section 232c stores the original data signal O-DATA. Then, the control section 231c reads the data signals stored in the memory section 232c line by line, in response to the original control signal OCS. The control section 231c outputs first and second data signals read from the memory section 232c, a horizontal control signal HCS for driving the data driving section 233c, a first vertical signal VCS1 for controlling the first gate driver 240c, and a second vertical control signal VCS2 for controlling the second gate driver 310.

The data driving section 233c transmits the first and second data signals M-DATA and S-DATA to the first data lines DL1-1 to DL1-m via the data signal output terminals $OT_{1-1}$ to $OT_{1-m}$ in response to the horizontal control signal HCS provided from the control section 221c. The data driving section 233c transmits the gate signals through the first gate driving output terminal $OT_2$ and the second gate signal output terminal $OT_3$. The first vertical control signal VCS1 is output through the first gate signal output terminal $OT_2$ and the second vertical control signal VCS2 is output through the second gate signal output terminal $OT_3$.

Figure 12A:
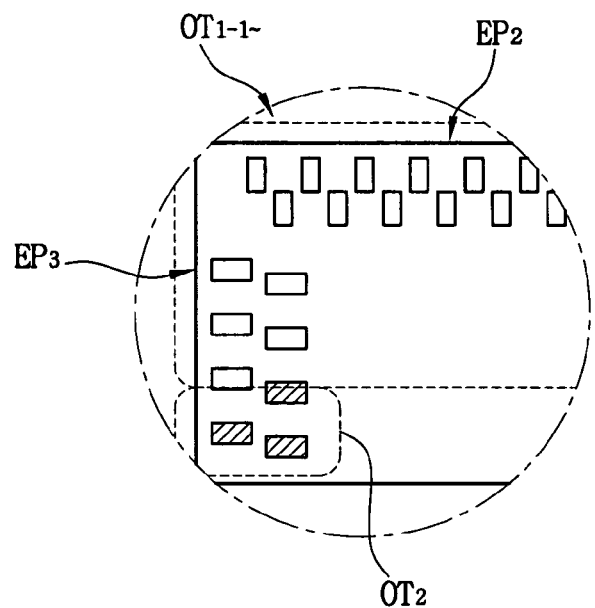
FIG. 12A and FIG. 12B are enlarged views of the driver of FIG. 9.
Figure 12B:
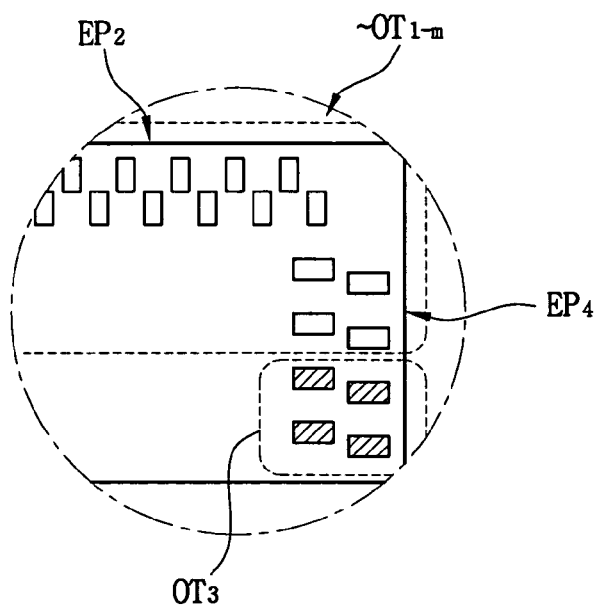

FIG. 12A is an enlarged view of the portion marked as "C" in FIG. 9, and FIG. 12B is an enlarged view of the portion marked as "D" in FIG. 9. As shown in FIGS. 12A and 12B, the data signal output terminals $OT_{1-1}$ to $OT_{1-m}$ are electrically connected to the first data lines $DL_{1-1}$ to $DL_{1-m}$ of the first display region $DA_1$ at the first sub-region SA1. A subgroup of the first data lines $DL_{1-1}$ to $DL_{1-m}$, namely $DL_{1-1}$ to $DL_{1-j}$, is electrically connected to the second data lines DL2-1 to DL2-j via the first connection lines $CL_{1-1}$ to $CL_{1-j}$. Thus, the first data signal M-DATA output from the data driving section 223c is applied to the first data lines $DL_{1-1}$ to $DL_{1-m}$. The second data signal S-DATA is applied to the second data lines $DL_{2-1}$ to $DL_{2-j}$ of the second display region $DA_2$ via a subset $DL_{1-1}$ to $DL_{1-j}$ of the first data lines and the first connection lines $CL_{1-1}$ to $CL_{1-j}$.

As shown in FIGS. 12A and 12B, the first gate signal output terminal $OT_2$ is formed at the third edge region DP3 of the driver chip 210, and the second gate signal output terminal $OT_3$ is formed at the fourth edge region $EP_4$.

Referring back to FIGS. 9 and 11, the first gate signal output terminal $OT_2$ is electrically connected to the first gate driver 240c at the second sub-region SA2, so that the first vertical control signal VCS1 is applied to the first gate driver 240c. The first gate driver 240c applies the first gate signal to the first gate lines $GL_{1-1}$ to $GL_{1-n}$ in response to the first vertical control signal VCS1.

The second gate signal output terminal $OT_3$ is electrically connected to the second gate driver 310c via the second connection line $CL_2$ formed on the third sub-region SA3 and the second flexible printed circuit board 350. Thus, the second vertical control signal VCS2 is applied to the second gate driver 310c. The second gate driver 310c applies the second gate signal to the second gate lines $GL_{2-1}$ to $GL_{2-i}$ in response to the second vertical control signal VCS2.

The first and second gate drivers 240c and 310c are not built into the driver 230c. Thus, the first and second gate signal output terminals $OT_2$ and $OT_3$ output the first and second vertical control signals VCS1 and VCS2, respectively. In this embodiment, the third and fourth edge regions $EP_3$ and $EP_4$ are shared by some of the data signal output terminals $OT_{1-1}$ to $OT_{1-m}$ and some gate signal output terminals. Through this sharing of edge regions $EP_3$ and $EP_4$, the number of the data signal output terminals $OT_{1-1}$ to $OT_{1-m}$ can be increased, thereby enhancing the resolution of the primary and/or secondary display panels 200c, 300c without increasing the size of the driver 230c.

Embodiment 3

FIG. 13, FIG. 14, FIG. 15A, and FIG. 15B pertain to the electronic device 600d having a third embodiment of the driver chip 230, herein referred to as the driver 230d. This electronic device 600, like Embodiment 2, has a first gate driver 240d and a second gate driver 310d that are external to the driver 230c. However, unlike Embodiment 2, this embodiment does not include separate first and second gate signal output terminals. As will be explained below, both the first and the second vertical control signals VCS1 and VCS2 are output from the driver 230d through a shared gate signal output terminal.

Figure 13:
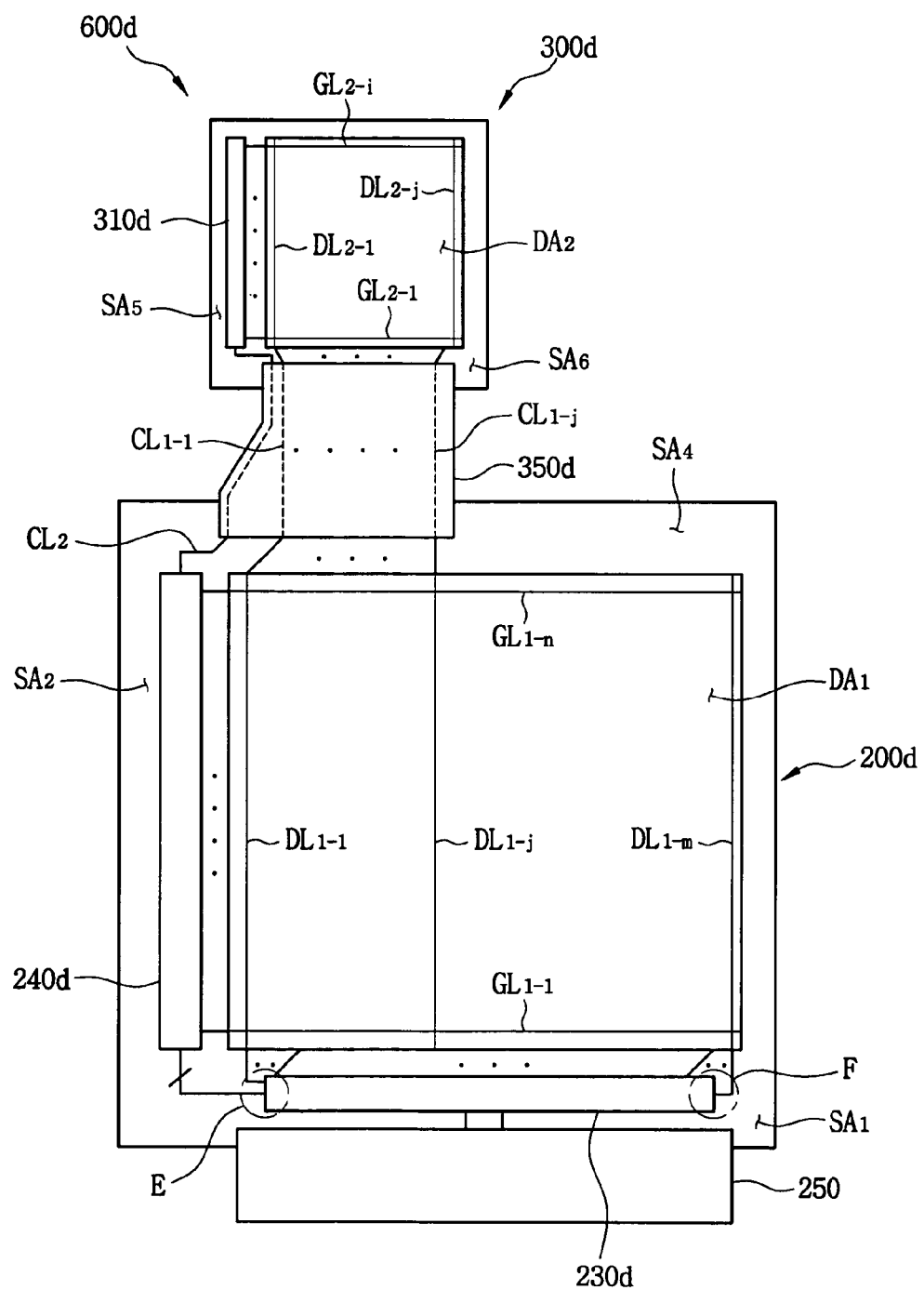
FIG. 13 is a schematic diagram of an electronic device including a fourth embodiment of the invention.

FIG. 13 is a schematic view of the primary and secondary display panels 200d, 300d that are operated by the driver 230d. As in the embodiments described above, the primary display panel 200d has first gate lines $GL_{1-1}$ to $GL_{1-n}$ and first data lines $DL_{1-1}$ to $DL_{1-m}$. The driver 230d receives signals from the CPU 100 (see FIG. 2) via the first printed circuit board 250 and outputs different data line signals for the first data lines $DL_{1-1}$ to $DL_{1-m}$. As for the gate lines $GL_{1-1}$ to $GL_{1-n}$, the driver 230d forwards the gate line signals to the first gate driver 240d, which then distributes the signals to the gate lines $GL_{1-1}$ to $GL_{1-n}$.

The secondary display panel 300d is also driven by the driver 230d. As in Embodiments 1 and 2, a subgroup of the first data lines, namely $DL_{1-1}$ to $DL_{1-j}$, are electrically coupled to the second data lines $DL_{2-1}$ to $DL_{2-j}$ via the connection lines $CL_{1-1}$ to $CL_{1-j}$ on the second printed circuit board 350. However, signals are transmitted from the driver 230d to the second gate lines $GL_{2-1}$ to $GL_{2-i}$ in a different manner than in Embodiment 1 or Embodiment 2. In this embodiment, the gate control signals for both the first and the second gate lines pass through the first gate driver 240d, of which only a subgroup reaches the second gate driver 310d. In response to the first gate control signals, the first gate driver 240d applies the first gate signals to the first gate lines $GL_{1-1}$ to $GL_{1-n}$. The second gate control signals pass through the first gate driver 240d, cross over to the second display panel 300 via the connecting line $CL_2$, and become applied to second gate lines $GL_{2-1}$ to $GL_{2-i}$ by the second gate driver 310d. The connecting line $CL_2$ extends across the fourth sub-region SA4, across the second printed circuit board 350, and forms an input to the second gate driver 310d. The second gate driver 310d is located in the fifth sub-region SA5.

Figure 14:
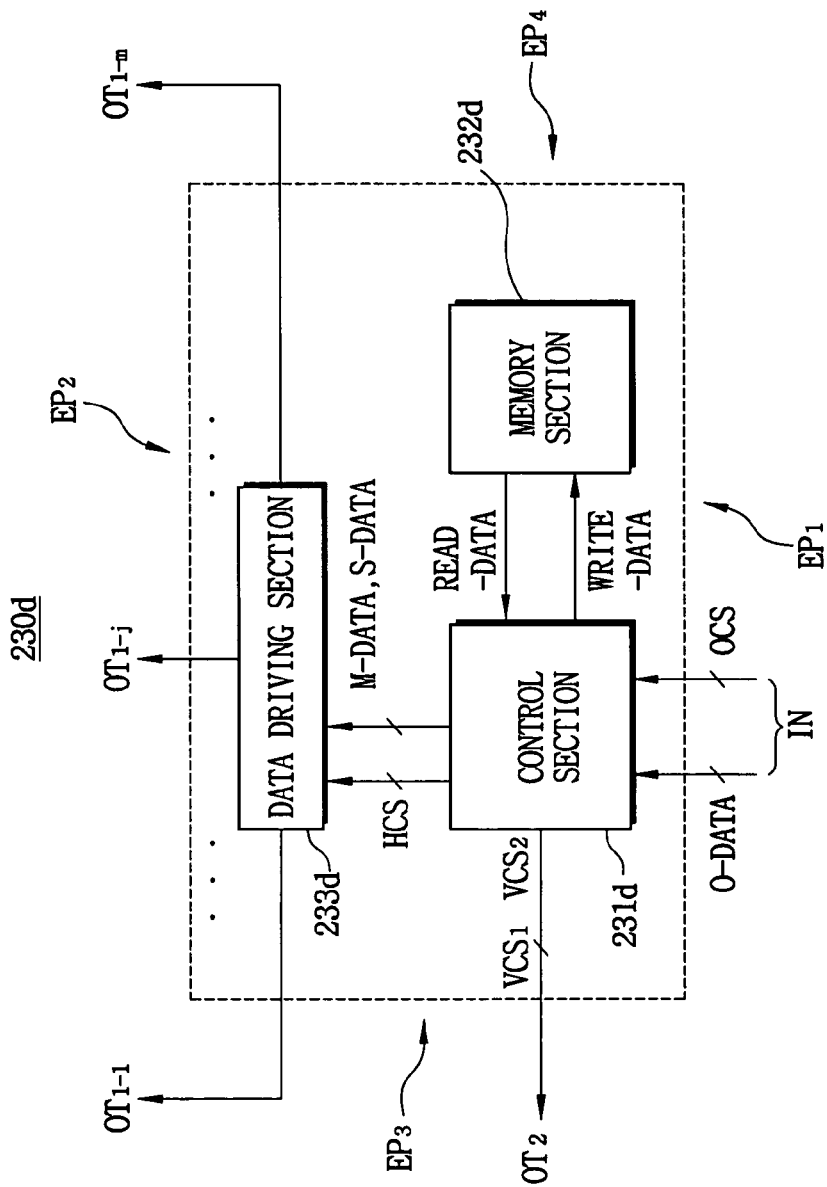
FIG. 14 is a block diagram of the driver of FIG. 13.

FIG. 14 is a block diagram of the driver chip 230d shown in FIG. 13. As shown, the driver chip 230d has several components in common with the driver chip 230c of Embodiment 2 described above. For example, the driver chip 230d has the control section 231d, the memory section 232d, and a data driving section 233d. The control section 231d outputs first and second data signals M-DATA and S-DATA, a data control signal (HCS), and the first and second vertical control signals VCS1 and VCS2 in response to the original data signal O-DATA and the original control signal OCS.

The data driving section 233d applies the first and second data signals M-DATA and S-DATA to the data signal output terminals $OT_{1-1}$ to $OT_{1-m}$ of the driver 230d in response to the data control signal HCS from the control section 231d.

Unlike Embodiment 2, which includes the control section 231c having separate gate control signal output terminals $OT_2$ and $OT_3$, the control section 231d uses a shared gate signal output terminal $OT_2$. The driver 230d outputs the first and the second gate control signals (VCS1 and VCS2) through the shared gate signal output terminal $OT_2$. As shown, the shared gate signal output terminal $OT_2$ is formed near the third edge region $EP_3$ of the driver 230d.

The shared gate signal output terminal $OT_2$ is electrically connected to the first gate driver 240d at the second sub-region SA2, so that the first vertical control signal VCS1 is applied to the first gate driver 240d. The first gate driver 240d applies the first gate signal to the first gate lines $GL_{1-1}$ to $GL_{1-n}$, in response to the first vertical control signal VCS1.

The first gate driver 240 is electrically connected to the second gate driver 310 via the second connection line $CL_2$. Thus, the second vertical control signal VCS2 is applied to the second gate driver 310d via the first gate driver 240d and the second connection line $CL_2$. The second gate driver 240d and the second connection line $CL_2$. The second gate driver 310d applies the second gate signal to the second gate lines $GL_{2-1}$ to $GL_{2-i}$, in response to the second vertical control signal VCS2.

Figure 15A:
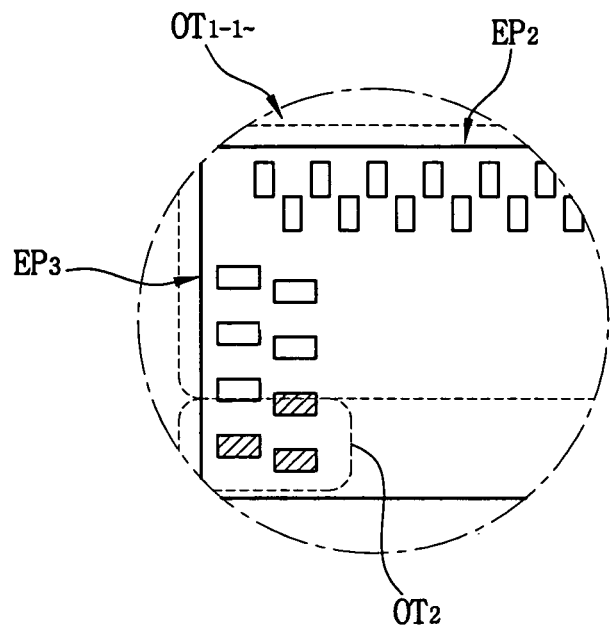
FIG. 15A and FIG. 15B are enlarged views of the driver of FIG. 13.
Figure 15B:
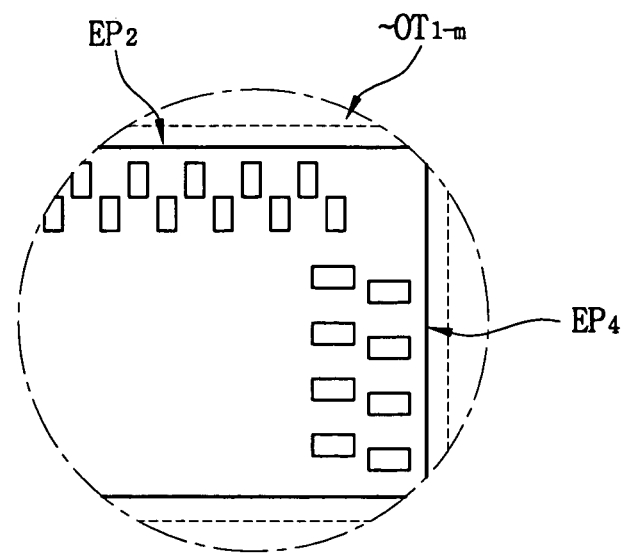
Figure 16:
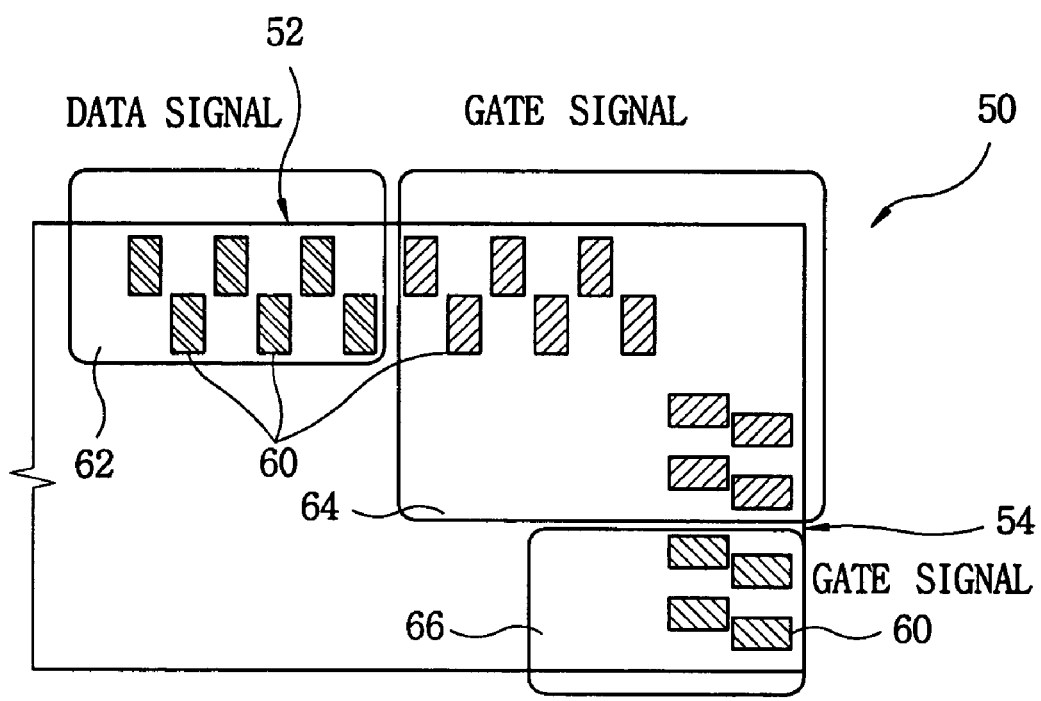
FIG. 16 is a currently available driver for operating multiple display panels.

FIG. 15A is an enlarged view of the portion marked "E" in FIG. 13, and FIG. 15B is an enlarged view of the portion marked as "F" in FIG. 13. As shown, the data signal output terminals $OT_{1-1}$ to $OT_{1-m}$ occupy three different edge regions of the driver 230d. More precisely, the data signal output terminals $OT_{1-1}$ to $OT_{1-m}$ are located on the second, third, and fourth edge regions $EP_2$, $EP_3$, and $EP_4$, wherein the third edge region $EP_3$ is shared with the gate control signal output terminal $OT_2$. By consolidating the gate control signals into one set of output terminals $OT_2$, the number of the data signal output terminals $OT_{1-1}$ to $OT_{1-m}$ may be increased to enhance the resolution. Since the total number of output terminals remain the same, enhanced resolution is achieved without enlarging the overall size of the driver 230d.

In the embodiments described above, the driver chip 230 is used to drive both the primary and the secondary LCD panels 200, 300. In the embodiments described, there is one data driving section that is built into the driver chip 230. Since the data driving section sends data signals to different data lines, the data driving section being integrated into the driver 230 results in many of the output terminals of the driver chip 230 being coupled to data lines. As for the gate drivers, there is a first gate driver for the primary display panel 200 and a second gate driver for the secondary display panel 300. The gate drivers may be formed in the display panels. Alternatively, as shown above in FIG. 7, the second gate driver may be implemented as an integral part of the driver chip 230. Where the gate driver is external to the driver 230, the second gate control signals may reach the second gate driver through the first gate driver for the primary display panel 200. Alternatively, the second gate signals may reach the second gate driver via a connecting line that does not include the first gate driver.

It is well known that the gate drivers scan the display panels 200, 300 line by line. The first and second gate control signals (VCS1 and VCS2) may send control signals to the gate drivers 240 and 310 so that the two gate drivers scan the respective gate lines at the same time. Alternatively, the first and second gate control signals (VCS1 and VCS2) may send control signals so that the second gate driver 310 starts its scanning after a preselected line of the first gate driver 240 is scanned.

The invention has been described using variations and examples to enable one skilled in the art to develop an understanding of the invention. Numerous variations may be implemented within the spirit and scope of the invention. As such, one skilled in the art should reference the claims of the invention rather than the foregoing examples to assess rights entitled to with respect to the claims.

What is claimed is:

1. An electronic device comprising:
   a first display area having a plurality of first gate lines and a plurality of first data lines;
   a first peripheral region adjacent to the first display area;
   a second display area having a plurality of second gate lines and a plurality of second data lines, wherein the second data lines are electrically coupled to the first data lines; and
   a second peripheral region adjacent to the second display area;
   a driver chip, wherein the driver chip outputs gate control signals (YeS) and provides data signals to the data lines;

a first gate driver in the first peripheral region, wherein the first gate driver provides first gate signals to the first gate lines in response to the gate control signals; and a second gate driver in the second peripheral region, wherein the second gate driver provides second gate signals to the second gate lines in response to the gate control signals.

2. The device of claim 1, wherein the driver chip comprises:
an input terminal for receiving an input data signal and an input control signal;
a control section coupled to the input terminal for generating a data control signal (HeS) and the gate control signals (YeS) in response to the input data signal and the input control signal; and
data signal output terminals for supplying the data signals to the data lines.

3. The device of claim 2, wherein the gate control signal (YeS) includes a first gate control signal (yeS 1) for controlling the first gate driver and a second gate control signal (YeS2) for controlling the second gate driver.

4. The device of claim 3, wherein the first gate driver receives the first gate control signal and the second gate control signal from the control section and selectively forwards the second gate control signal to the second gate driver.

5. The device of claim 1, wherein at least one of the first and the second gate drivers include amorphous silicon thin film transistors.

6. The device of claim 1, wherein the gate control signals comprise a first clock signal (CK) and a second clock signal (CKB).

7. The device of claim 1, wherein the first gate driver is electrically coupled to the first gate lines and the second gate driver is electrically coupled to the second gate lines.

8. The device of claim 1, wherein the gate driver receives a ground voltage Vss and a source voltage VDO.

9. The device of claim 1 further comprising gate signal output terminals on the driver chip, wherein each of the gate signal output terminals are electrically coupled to one of the first and the second gate drivers.

10. The device of claim 9 further comprising connecting lines for
electrically coupling the gate signal output terminals to the second gate lines, wherein the connecting lines are formed on the first and the second peripheral regions.

11. The device of claim 1, wherein the driver chip further comprises:
a first timing section that is coupled to the control section, wherein the first timing section generates a first clock signal (CK1) and a second clock signal (CKB1); and
a second timing section that is coupled to the control section wherein the second timing section generates a third clock signal (CK2) and a fourth clock signal (CKB2).

12. The device of claim 11, wherein the first gate driver applies a first gate signal to the first gate lines according to the first clock signal and the second clock signal, and the second gate driver applies a second gate signal to the second gate lines according to the third clock signal and the fourth clock signal.

13. The device of claim 12, wherein the second gate driver applies the second gate signal to the second gate lines after a first gate signal is applied to a preselected one of the first gate lines.

14. The device of claim 1, wherein the second data signals for the second data lines are transmitted to the second data lines via the first data lines.

15. The device of claim 1, wherein at least one of the first gate driver and the second gate driver comprises a shift register including a plurality of states, each state having an output terminal, an input terminal, and a control terminal, the plurality of states configured such that the output terminal of a given stage is electrically coupled to the control terminal of the previous stage and the input terminal of the succeeding stage.

16. The device of claim 15, wherein the first gate driver further comprises:
a first clock for controlling a first group of the states; and
a second clock for controlling a second group of the states.

17. A driver chip set for use with an electronic device having a display panel, the chip set comprising:
an integrated circuit chip including:
an input terminal for receiving an input data signal and an input control signal;
a control section coupled to the input terminal for converting the input data signal to data signals and converting the input control signal to a data control signal (HCS), a first gate control signal (YCS1), and a second gate control signal (YCS2); and data signal output terminals coupled to the control section for transmitting the data signals;
a first gate driver separate from the integrated circuit chip, wherein the first gate driver applies first gate signals to a first display panel in response to the first gate control signal from the integrated circuit chip; and a second gate driver separate from the integrated circuit chip and the first gate driver,
wherein the second gate driver applies second gate signals to a second display panel in response to the second gate control signal from the integrated circuit chip,
wherein the first and second gate drivers drive first and a second panels respectively.

18. A driver chip set for use with an electronic device having a display panel, the chip set comprising:
an integrated circuit chip including:
an input terminal for receiving an input data signal and an input control signal;
a control section coupled to the input terminal for converting the input data signal to data signals and converting the input control signal to a data control signal (HCS), a first gate control signal (VCS1), and a second gate control signal (VCS2); and
data signal output terminals coupled to the control section for transmitting the data signals;
a first gate driver separate from the integrated circuit chip, wherein the first gate driver applies first gate signals to a first display panel in response to the first gate control signal from the integrated circuit chip; and a second gate driver separate from the integrated circuit chip;
and a second gate driver separate from the integrated circuit chip and the first gate driver, wherein the second gate driver applies second gate signals to a second display panel in response to the second gate control signal from the integrated circuit chip,
wherein the integrated circuit chip has a rectangular surface having a first edge region, a second edge region, a third edge region, and a fourth edge region, wherein each edge region includes an edge of the rectangular surface, wherein the input terminal is located in the first edge region, and wherein the second edge region contains only the data signal output terminals and no gate signal output terminals.

19. The chip set of claim 18, wherein the data signal output terminals are positioned in the second edge region, the third edge region, and the fourth edge region.

20. The chip set of claim 18, wherein the first gate control signal output terminals and the second gate control signal output terminals are in mutually exclusive edge regions.

21. The chip set of claim 17, wherein the integrated circuit chip further comprises a data driving section receiving the data control signals from the control section and generating the data signals to output through the data signal output terminals.

22. The chip set of claim 17 further comprising:
    first gate control signal output terminals on the integrated circuit chip; and
    second gate control signal output terminals on the integrated circuit chip, wherein the first and second gate control signals are transmitted through the first and the second gate control signal output terminals, respectively.

23. The chip set of claim 17 further comprising gate control signal output terminals on the integrated circuit chip, wherein the first gate control signal and the second gate control signal are transmitted via a same one of the gate control signal output terminals.

24. A driver chip for a display device having a first display panel and a second display panel, the driver chip having a rectangular surface with a first edge region, a second edge region, a third edge region, and a fourth edge region, the driver chip comprising:
    a first edge region having input terminals for receiving input signals; a second edge region having data signal output terminals and gate control signal output terminals to a first gate driver in the first display panel;
    a third edge region having data signal output terminals and gate control signal output terminals to a second gate driver in the second display panel; and
    a fourth edge region having gate control signal output terminals to the second driver.

25. A display panel driver chip having a rectangular surface with a first edge region, a second edge region, a third edge region, and a fourth edge region, comprising:
    a first edge region having input terminals for receiving input signals;
    a second edge region having data signal output terminals;
    a third edge region having data signal output terminals and first gate control signal output terminals; and
    a fourth edge region having data signal output terminals and second gate control signal output terminals;
    wherein the first gate control signal output terminals and the second gate control signal output terminals transmit signals to different gate drivers.

26. An electronic device comprising:
    a first display area having a plurality of first gate lines and a plurality of first data lines;
    a first peripheral region in a same plane as the first display area;
    a first gate driver formed in the first peripheral region, wherein the first gate driver provides gate signals to the first gate lines;
    a second display area having a plurality of second gate lines and a plurality of second data lines,
    wherein the second data lines are electrically coupled to the first data lines, the second data lines receiving the data signals from the first data lines;
    a second peripheral region in a same plane as the second display area;
    a second gate driver formed in the second peripheral region, wherein the second gate driver provides gate signals to the second gate lines; and
    an integrated circuit driver chip spaced apart from the first and the second gate drivers and transmitting gate control signals to the first gate driver and data signals to the first data lines.

27. The device of claim 26, wherein the integrated circuit driver chip is located in the first peripheral region.

\* \* \* \* \*